(12) United States Patent
Bujold et al.

(10) Patent No.: US 10,088,016 B2
(45) Date of Patent: Oct. 2, 2018

(54) WINCH-WINDING ASSEMBLY FOR FLATBED WINCHES

(71) Applicant: USINAGE NUMÉRIQUE H.B. INC., Dolbeau-Mistassini (CA)

(72) Inventors: Hermel Bujold, Dolbeau-Mistassini (CA); Jacques Fortin, St.-Edmond-les-Plaines (CA); Vincent Girard, Normandin (CA); Pierre Thériault, Dolbeau-Mistassini (CA); Michel Taillon, St-Prime (CA)

(73) Assignee: USINAGE NUMERIQUE H.B. INC., Dolbeau-Mistassini (CA)

(*) Notice: Subject to any disclaimer, the term of this patent is extended or adjusted under 35 U.S.C. 154(b) by 122 days.

(21) Appl. No.: 15/249,942

(22) Filed: Aug. 29, 2016

(65) Prior Publication Data
US 2017/0058998 A1 Mar. 2, 2017

Related U.S. Application Data

(60) Provisional application No. 62/212,678, filed on Sep. 1, 2015.

(30) Foreign Application Priority Data

May 19, 2016 (CA) ...................... 2930713

(51) Int. Cl.
*F16H 1/16* (2006.01)
*B60P 7/08* (2006.01)
*B66D 1/14* (2006.01)

(52) U.S. Cl.
CPC .............. *F16H 1/16* (2013.01); *B60P 7/0853* (2013.01); *B66D 1/14* (2013.01)

(58) Field of Classification Search
CPC ........ F16H 1/16; B60P 7/0853; B60P 7/0846; B66D 1/14
See application file for complete search history.

(56) References Cited

U.S. PATENT DOCUMENTS 3,319,482 A * 5/1967 Campbell ................. F16H 1/16
74/425
4,457,078 A * 7/1984 Suchy .................. B25H 1/0085
33/334

(Continued)

FOREIGN PATENT DOCUMENTS

CA 2930713 A1 3/2017
WO WO-2012131595 A1 * 10/2012 ............... F16H 1/16

OTHER PUBLICATIONS

Notice of Allowance dated Sep. 6, 2017 issued in Canadian Patent Application No. 2,930,713.

(Continued)

*Primary Examiner* — Michael E Gallion
(74) *Attorney, Agent, or Firm* — Harness, Dickey and Pierce, P.L.C.

(57) ABSTRACT

A winch-winding assembly for use with a flatbed winch, for example. The winch-winding assembly can be used for winding tie-down straps. The winch-winding assembly can include a gear system, a drive shaft connected to the gear system in order to cause rotation of the gear system and an engagement arm being configured to engage with and rotate part of the flatbed winch. A drill-support mechanism can be further provided to guide or support a body of a hand-held drill during engagement and rotation of the drive shaft. The engagement arm can comprise a stem and a finger mounted to the stem and being displaceable between a retracted position disengaging the flatbed winch, and an extended (Continued)

position engaging the flatbed winch, to rotate the winch drum in response to rotation of the stem.

23 Claims, 22 Drawing Sheets

(56) References Cited

U.S. PATENT DOCUMENTS

| | | | | |
|---|---|---|---|---|
| 6,705,597 | B1 * | 3/2004 | Reilly | B60P 7/0846 254/223 |
| 6,729,604 | B1 * | 5/2004 | Claycomb | B60P 7/0846 24/68 R |
| 7,108,246 | B2 * | 9/2006 | Fortin | B60P 7/083 24/69 ST |
| 7,278,808 | B1 * | 10/2007 | Sisk, Sr. | B60P 7/0853 279/144 |
| 7,357,612 | B1 * | 4/2008 | Paul | B60P 7/0853 279/144 |
| 7,410,336 | B2 * | 8/2008 | Parks | B60P 7/0846 279/144 |
| 7,644,906 | B2 * | 1/2010 | Rodrigue | B60P 7/0846 123/185.3 |
| D682,073 | S * | 5/2013 | Payne | D8/359 |
| 9,616,801 | B2 * | 4/2017 | Williams | B60P 7/0853 |
| 9,789,984 | B2 * | 10/2017 | Sikora | B65B 13/025 |
| 2004/0022615 | A1 * | 2/2004 | Land | B62B 1/10 414/630 |
| 2007/0125203 | A1 * | 6/2007 | Nguyen | B25B 13/481 81/57.29 |
| 2008/0087123 | A1 * | 4/2008 | Li | F16H 1/16 74/425 |
| 2008/0156132 | A1 * | 7/2008 | Pachov | B66D 1/14 74/425 |
| 2009/0074531 | A1 * | 3/2009 | Schmidt | B60P 7/0853 410/103 |
| 2009/0308191 | A1 * | 12/2009 | Tseng | B66F 3/12 74/421 A |
| 2011/0079967 | A1 * | 4/2011 | Presley | B25F 3/00 279/145 |
| 2011/0101144 | A1 * | 5/2011 | Denning | B25B 13/02 242/390 |
| 2013/0085053 | A1 * | 4/2013 | Figiel | B65B 13/025 493/84 |
| 2014/0007781 | A1 * | 1/2014 | Sikora | B65B 13/22 100/29 |
| 2014/0061556 | A1 * | 3/2014 | Knox | B60P 7/0846 254/220 |
| 2014/0260720 | A1 * | 9/2014 | Hartranft | F16H 21/22 74/42 |
| 2016/0046228 | A1 * | 2/2016 | Williams | B60P 7/0846 410/98 |
| 2016/0051267 | A1 * | 2/2016 | Sander | A61B 17/1682 606/80 |
| 2016/0339830 | A1 * | 11/2016 | McLemore | B60P 7/0846 |
| 2017/0058998 | A1 * | 3/2017 | Bujold | F16H 1/16 |
| 2017/0193973 | A1 * | 7/2017 | Middleton | G10D 3/14 |
| 2017/0355298 | A1 * | 12/2017 | Cahall | B60P 7/0853 |

OTHER PUBLICATIONS

Office Action dated Jun. 12, 2017 issued in Canadian Patent Application No. 2,930,713.
Response dated Jul. 7, 2017 to Office Action dated Jun. 12, 2017 issued in Canadian Patent Application No. 2,930,713.

* cited by examiner

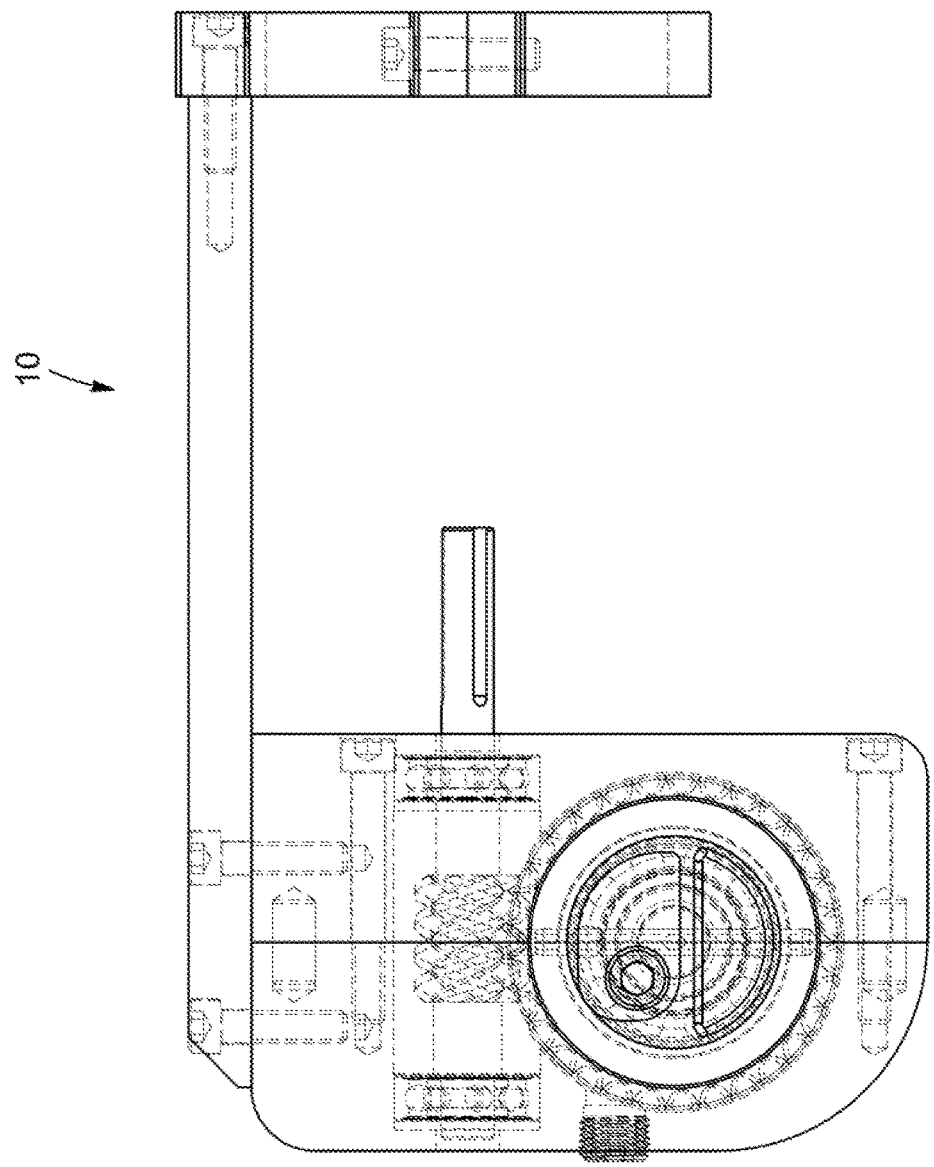

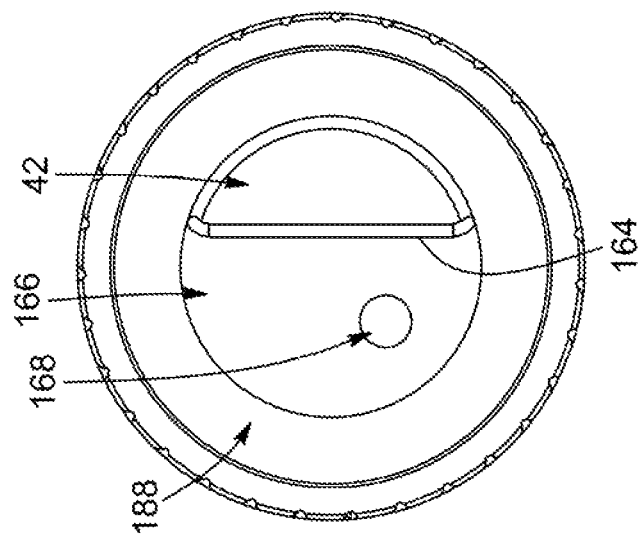
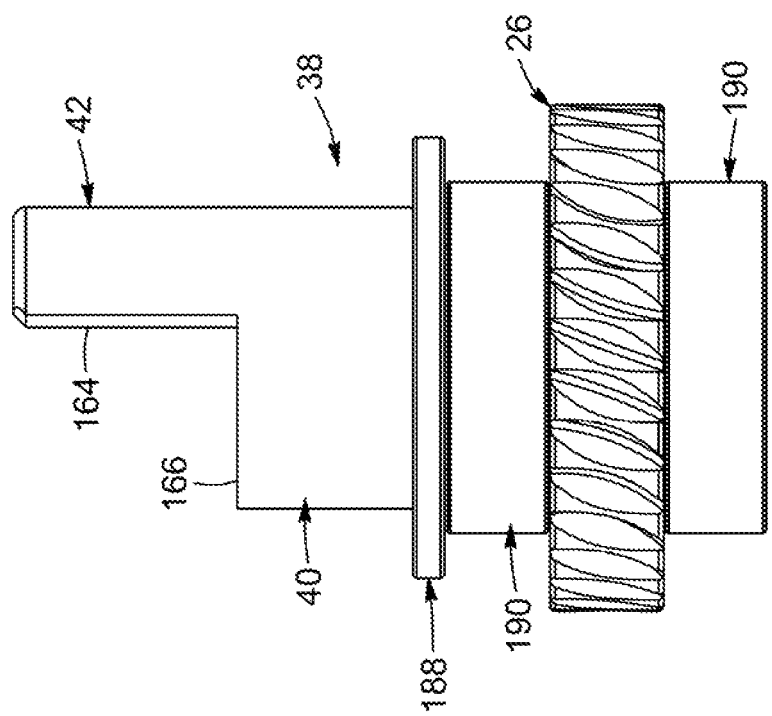

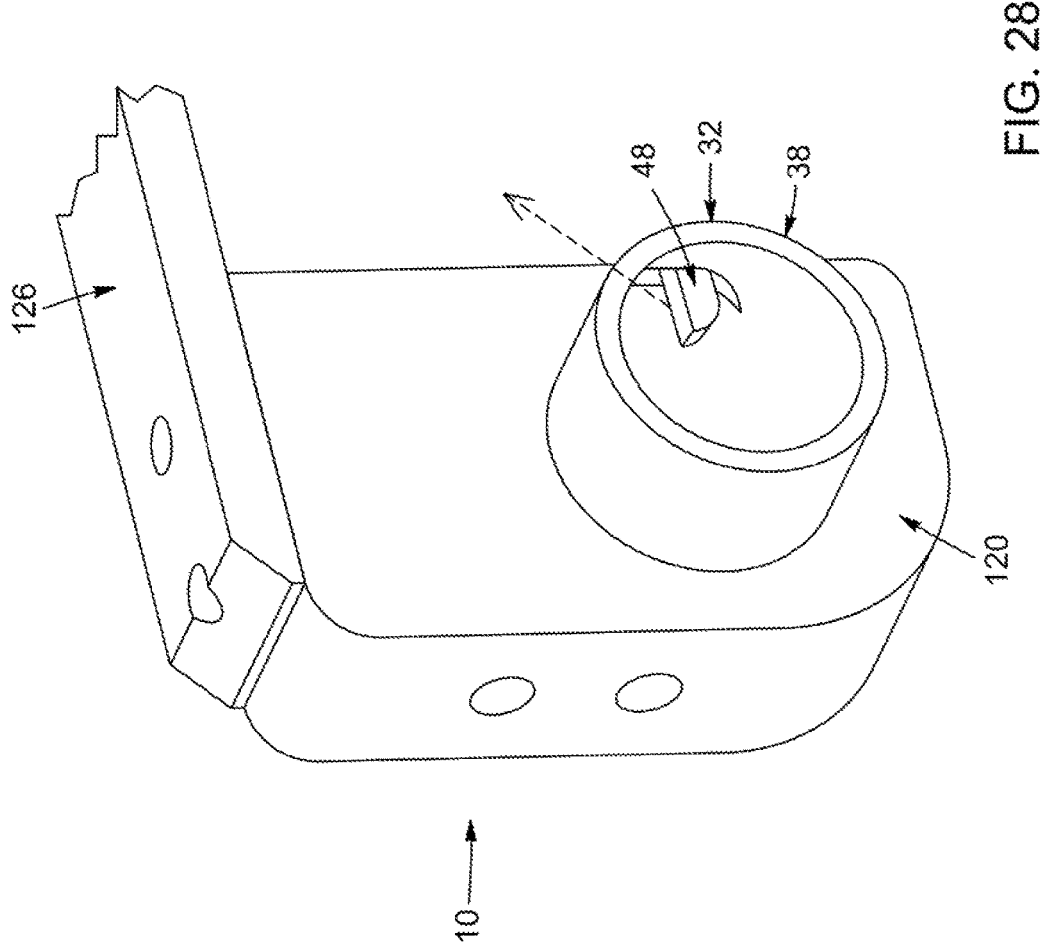

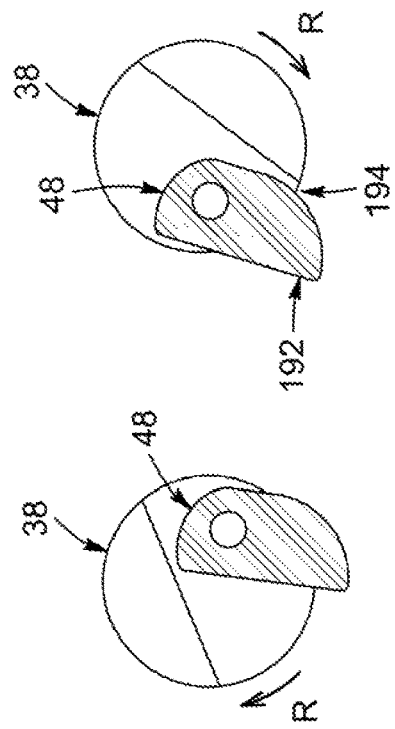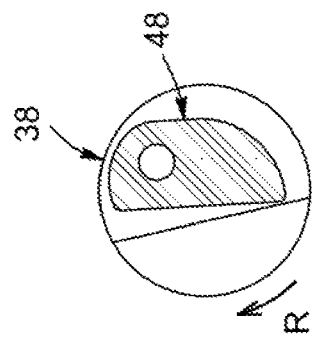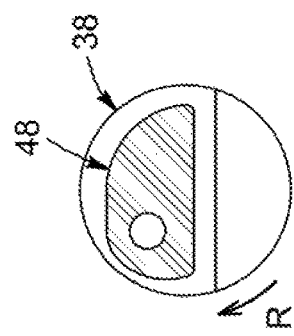
FIG. 29D   FIG. 29C   FIG. 29B   FIG. 29A

WINCH-WINDING ASSEMBLY FOR FLATBED WINCHES

PRIORITY STATEMENT

This patent application claims the benefit of U.S. Patent No. 62/212,678 filed on 1 Sep. 2015 and priority to Canadian Patent Application No. 2930713 filed on 19 May 2016. The entire disclosures of each of the above recited applications are incorporated herein by reference.

TECHNICAL FIELD

The technical field generally relates to winches for flatbeds, and more particularly, relates to a winch-winding assembly for use with a flatbed winch for winding tie-down straps or other winding or rotation applications.

BACKGROUND

Cargo tie-downs, also called hold downs or lashing straps, are commonly used to secure loads on open top compartments, such as truck trailers. The strap, band or cord is tensioned across the load to secure the load to the vehicle.

Typically, a flatbed winch is used to wind the straps tightly around the load. The use of multiple flatbed winches and straps can be desirable for securing large loads. When using a typical flatbed winch, the winding of the winch becomes increasingly difficult as the straps are being tightened. A rod can often be used to act as a lever that connects to part of the winch such that a user can forcibly push downward on the rod to tighten the straps.

However, using a rod to manually wind the winch has various disadvantages, such as increased risk of injury and inefficiency.

There is a need for a winch-winding assembly that overcomes at least some of the disadvantages of what is known in the art.

SUMMARY

In some implementations, there is provided a winch-winding assembly connectable to a flatbed winch for winding tie-down straps, the flatbed winch comprising a winch drum having an open end and a lateral opening, the winch-winding assembly comprising:
- a gear system;
- a drive shaft connected to the gear system and being rotatable about a longitudinal axis thereof in order to cause rotation of the gear system;
- an engagement arm configured to engage with and rotate the winch drum, the engagement arm comprising:
  - a stem rotatable about a longitudinal axis thereof and comprising:
    - a proximal portion attached to the gear system to be rotated thereby; and
    - a distal portion extending away from the gear system; and
  - a finger mounted to the stem and being pivotable between:
    - a retracted position where the finger is retracted sufficiently to allow the distal portion to be axially insertable with respect to the open end of the winch drum; and
    - an extended position where the finger extends through the lateral opening of the winch drum in order to engage and rotate the winch drum in response to rotation of the stem.

In some implementations, the gear system comprises a worm gear set.

In some implementations, the worm gear set comprises a worm integrally connected to the drive shaft; and a worm wheel connected to the proximal portion of the stem.

In some implementations, the drive shaft is configured to be perpendicular with respect to the stem of the engagement arm.

In some implementations, the stem comprises a tubular wall defining a channel and having a lateral aperture, and wherein the finger is mounted within the channel.

In some implementations, the finger is mounted and configured so as to be fully housed within the channel in the retracted position and to partially extend through the lateral aperture in the extended position.

In some implementations, the finger is pivotally mounted within the channel to be pivotable between the retracted position and the extended position.

In some implementations, the engagement arm further comprises an end cap fitted on an extremity of the distal portion, the end cap comprising a hinge extending within the channel and to which the finger is pivotally mounted.

In some implementations, the hinge is offset with respect to the longitudinal axis of the stem.

In some implementations, the finger is mounted to the hinge and configured to pivot to the extended position in response to rotation of the stem in a winch-tightening direction, and to pivot to the retracted position in response to rotation of the stem in a winch-loosening direction.

In some implementations, the drive shaft is configured to be engaged by a hand-held drill to effect the rotation thereof.

In some implementations, the stem is a solid structure.

In some implementations, the proximal portion of the stem is cylindrical and the distal portion of the stem is partial-cylindrical.

In some implementations, the distal portion has a cross-section that is a segment of a circular cross-sectional of the proximal portion.

In some implementations, segment is spaced away from a cross-sectional center of the proximal portion.

In some implementations, the finger comprises a finger opening that is mounted about a fastener that is fixed within the stem.

In some implementations, the fastener extends axially into the stem, and the finger is radially pivotable about the fastener.

In some implementations, the fastener is offset with respect to a cross-sectional center of the proximal portion.

In some implementations, the finger is a single one-piece structure.

In some implementations, the finger has a shape such that an outer edge of the finger generally follows contours of the proximal portion of the stem.

In some implementations, the finger has a generally quarter-stadium cross-sectional shape.

In some implementations, there is provided a winch-winding assembly connectable to a flatbed winch for winding tie-down straps, the winch-winding assembly comprising:
- a gear box;
- a gear system mounted with respect to the gear box;
- a drive shaft connected to the gear system and being rotatable about a longitudinal axis thereof in order to cause rotation of the gear system, the drive shaft being configured for engagement by a rotating mechanism of a hand-held drill;
an engagement arm mounted to the gear system for being rotated thereby, the engagement arm being configured to engage with and rotate part of the flatbed winch to enable winding;
a drill-support mechanism comprising:
a support arm having a proximal section connected to the gear box and a distal section extending away from the gear box; and
a collar connected to the distal section of the support arm and defining an insertion region in which the hand-held drill is guidable so as to engage the drive shaft, the collar being spaced away from the drive shaft and configured such that the collar abuts on and supports a body of the hand-held drill during engagement and rotation of the drive shaft.

In some implementations, the rotating mechanism comprises a chuck of the hand-held drill.

In some implementations, the rotating mechanism comprises a driver bit of the hand-held drill.

In some implementations, the support arm comprises a plate fixed to and extending from an upper end of the gear box.

In some implementations, the plate is spaced apart from and generally parallel with respect to the drive shaft.

In some implementations, the collar comprises a closed annular member defining a generally circular insertion region.

In some implementations, the collar is made from a rigid material.

In some implementations, the collar comprises an upper member attached to an extremity of the distal section of the support arm; and a lower member attachable to the upper member.

In some implementations, the upper member and the lower member are generally U-shaped.

In some implementations, the drill-support mechanism further comprises at least one fastener for attaching the upper member to the distal section of the support arm.

In some implementations, the distal section of the support arm includes at least one opening for receiving the at least one fastener.

In some implementations, the upper member includes a protrusion extending radially from the upper member and adapted to receive the at least one fastener.

In some implementations, the upper member includes at each end thereof a lug comprising an aperture and the lower member includes at each end thereof a corresponding lug comprising an aperture, the lugs of the upper member abutting with respective lugs of the lower member to align the corresponding apertures and form lug pairs that are connectable together to attach the lower member to the upper member.

In some implementations, the collar further includes a plurality of lug fasteners, each lug fastener being insertable through the apertures of a corresponding lug pair for securing the lug pair together, thereby for attaching the lower member to the upper member.

In some implementations, the assembly includes one of more additional features described herein.

In some implementations, there is provided a winch-winding assembly connectable to a flatbed winch for winding tie-down straps, the flatbed winch comprising a winch drum having an open end and a lateral opening, the winch-winding assembly comprising:
a gear system;
a drive shaft connected to the gear system and being rotatable about a longitudinal axis thereof in order to cause rotation of the gear system;
the gear system comprising a worm gear set comprising:
a worm integrally connected to the drive shaft; and
a worm wheel;
an engagement arm configured to engage with and rotate the winch drum, the engagement arm comprising:
a stem rotatable about a longitudinal axis thereof and comprising:
a proximal portion attached to the worm wheel to be rotated thereby; and
a distal portion extending away from the gear system; and
the stem of the engagement arm being configured to be perpendicular with respect to the drive shaft;
a finger mounted to the stem and being displaceable between:
a retracted position where the finger is retracted sufficiently to allow the distal portion to be axially insertable into or over the winch drum to align with the lateral opening; and
an extended position where the finger extends through the lateral opening of the winch drum in order to engage and rotate the winch drum in response to rotation of the stem.

In some implementations, such an assembly further includes additional features regarding the stem and finger as described herein.

In some implementations, the engagement arm is configured for insertion into the winch drum, and the finger extends outwardly through the lateral opening of the winch drum in order to engage and rotate the winch drum in response to rotation of the stem.

In some implementations, there is provided a winch-winding assembly connectable to a flatbed winch for winding tie-down straps, the flatbed winch comprising a winch drum having an open end and a lateral opening, the winch-winding assembly comprising:
a gear system;
a drive shaft connected to the gear system and being rotatable about a longitudinal axis thereof in order to cause rotation of the gear system;
an engagement arm configured to engage with and rotate the winch drum, the engagement arm comprising:
a stem rotatable about a longitudinal axis thereof and comprising:
a proximal portion attached to the gear system to be rotated thereby; and
a distal portion extending away from the gear system;
wherein the stem has a tubular structure; and
a finger mounted to the stem and being displaceable between:
a retracted position where the finger is retracted sufficiently to allow the distal portion to be axially moved over the winch drum to align with the lateral opening; and
an extended position where the finger extends inwardly through the lateral opening of the winch drum in order to engage and rotate the winch drum in response to rotation of the stem.

In some implementations, there is provided a kit comprising a drill and a winch-winding assembly as defined herein, wherein the drill is mountable to the winch-winding assembly via the drill-support mechanism. In some implementations, the drill comprises a neck having an annular surface having a shape and size generally corresponding to the collar for being secured thereby.

In some implementations, there is provided a winding assembly for winding a drum having an open end, the winding assembly comprising:
  a gear system;
  a drive shaft connected to the gear system and being rotatable about a longitudinal axis thereof in order to cause rotation of the gear system;
  an engagement arm configured to engage with and rotate the winch drum, the engagement arm comprising:
    a stem rotatable about a longitudinal axis thereof and comprising:
      a proximal portion attached to the gear system to be rotated thereby; and
      a distal portion extending away from the gear system; the distal portion being configured to be insertable within the open end of the drum and to enable rotation thereof.

In some implementations, the distal portion is configured so that a finger is positioned relative thereto, the finger being pivotable or otherwise displaceable between a retracted position where the finger is retracted sufficiently to allow the distal portion to be axially insertable with respect to the open end of the winch drum; and an extended position where the finger extends through a lateral opening of the drum in order to engage and rotate the drum in response to rotation of the stem.

In some implementations, the distal portion comprises a block for insertion within the open end of the drum. The block can include a solid structure having a square cross-section, particularly when the open end of the drum cavity has a corresponding square cross-section. The block may be configured for cooperation with a rotatable drum used in railway applications. There may be two blocks extending from either side of the gear box.

In some implementations, the winding assembly has one or more additional features as described or illustrated herein. The assemblies described herein can also be used in other winding or rotation applications in various industries.

In some implementations, the engagement arm is removably connectable to the gear system. In other implementations, the engagement arm is permanently fixed to the gear system.

The components, advantages and other features of winch-winding assembly implementations will become more apparent upon reading of the following non-restrictive description of some optional configurations, given for the purpose of exemplification only, with reference to the accompanying drawings.

BRIEF DESCRIPTION OF THE DRAWINGS

FIG. 8 is a side plan partial transparent view of an embodiment of a winch-winding assembly.

FIG. 9 is a side plan view of a worm wheel and part of an engagement arm.

FIG. 10 is a front plan view of FIG. 9.

FIG. 28 is a perspective view schematic of part of another embodiment of a winch-winding assembly.

FIGS. 29A to 29D are plan view schematics that illustrate the movement of a finger during rotation of a stem, which may be used in a winch-winding assembly.

DETAILED DESCRIPTION

The present invention generally relates to a winch-winding assembly, which can be connectable to a flatbed winch for winding tie-down straps. Advantageously, the winch-winding assembly has a rotatable element that can be coupled to part of the flatbed winch without structurally modifying the flatbed winch. In some implementations, the winch-winding assembly includes an engagement arm that is configured to facilitate coupling to the winch and/or includes a drill-support mechanism configured to facilitate guiding or supporting a drill or a hand-held drill used to drive the winch-winding assembly.

The term "hand-held drill" can include any portable powered device adaptable for causing a rotation of the winch-winding assembly.

Figure 1:
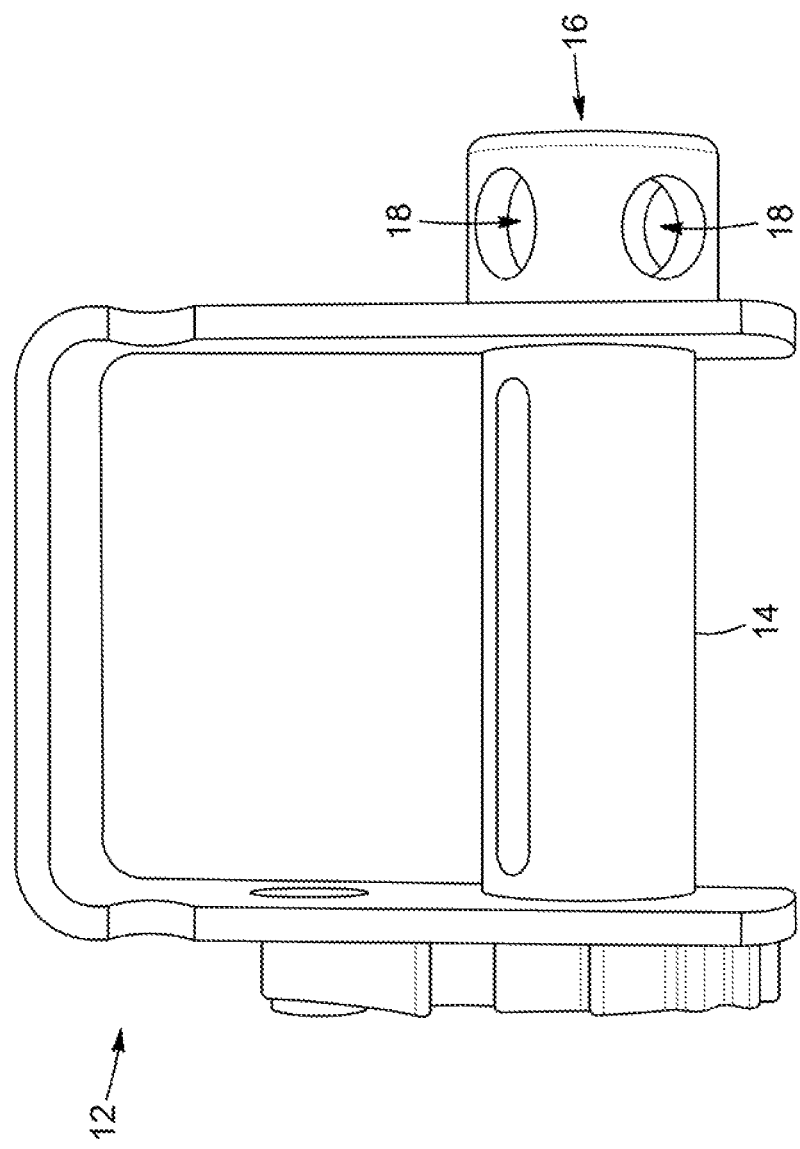
FIG. 1 is a side schematic view of a flatbed winch commonly used for winding straps according to prior art.

Referring to FIG. 1, there is shown a typical flatbed winch 12. The flatbed winch 12 includes a winch drum 14 having an open end 16 and at least a lateral opening 18. The flatbed winch 12 is a mechanical device used to wind up a rope, a strap or the like. It should be noted that the winch-winding assembly can be used for winding the flatbed winch 12 or various other types of winches or similar windable mechanisms.

Figure 2:
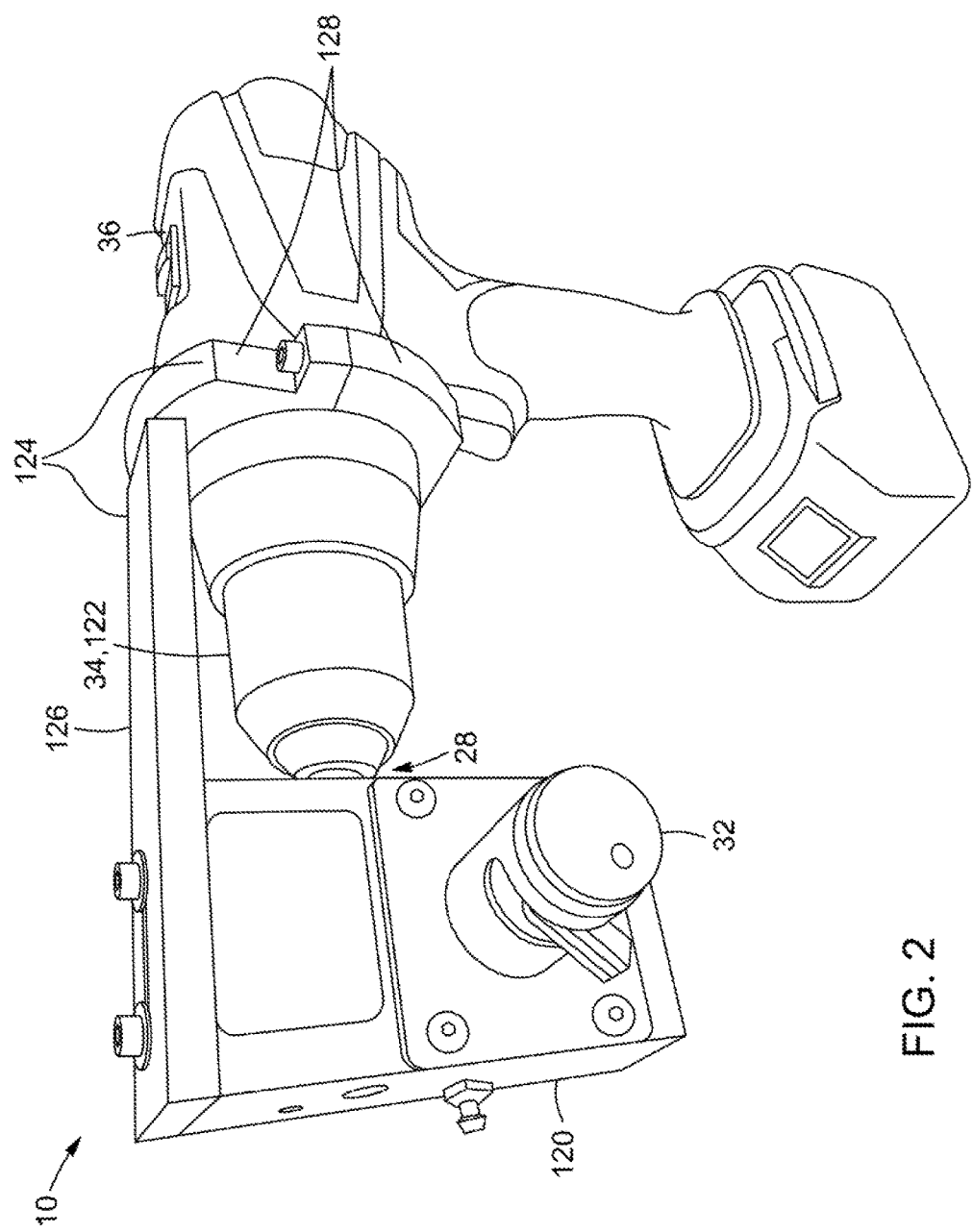
FIG. 2 is a perspective view of a winch-winding assembly according to an embodiment of the present invention, attached to a hand-held drill.
Figure 4:
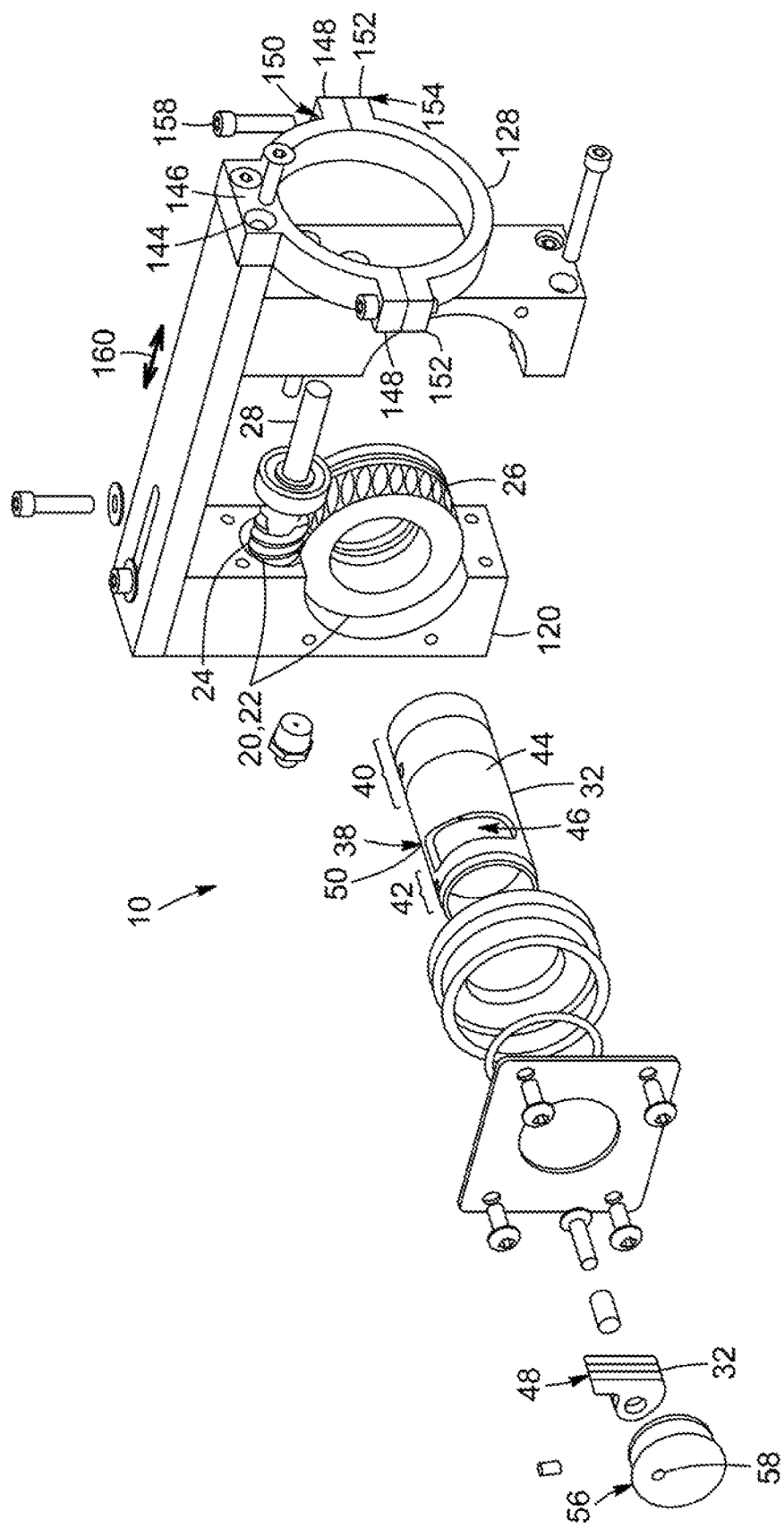
FIG. 4 is a front perspective partially-exploded view of a winch-winding assembly.

With reference to FIGS. 2 and 4, there is shown an embodiment of a winch-winding assembly 10 attached to a hand-held drill 36. The winch-winding assembly 10 includes a gear system 20. The gear system 20 can include gear arrangements that can reduce an input rotational velocity into a suitable output rotational velocity.

Figure 5:
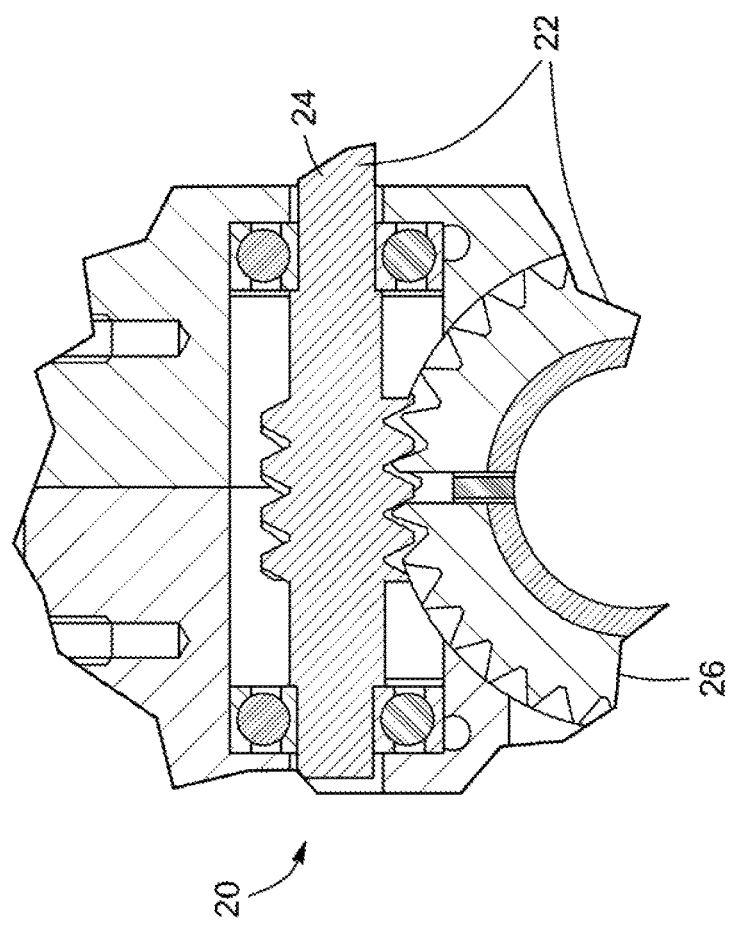
FIG. 5 is a cross-sectional view of part of a worm gear that is part of a winch-winding assembly.

In the illustrated embodiment of FIGS. 4 and 5, the gear system 20 comprises a worm gear set 22. The worm gear set 22 includes a worm 24 and a worm wheel 26. The worm 24 can be a gear in the form of a screw that meshes with the worm wheel 26. The worm wheel 26 can be a gear similar to a spur gear.

The worm gear set 22 can be configured to produce a velocity ratio, defined as the input rotational velocity of the hand-held drill 36 over the output rotational velocity, between 1 and 50, between 2 and 30, or between 5 and 20 for example. Preferably the velocity ratio is 10.

Figure 3A:
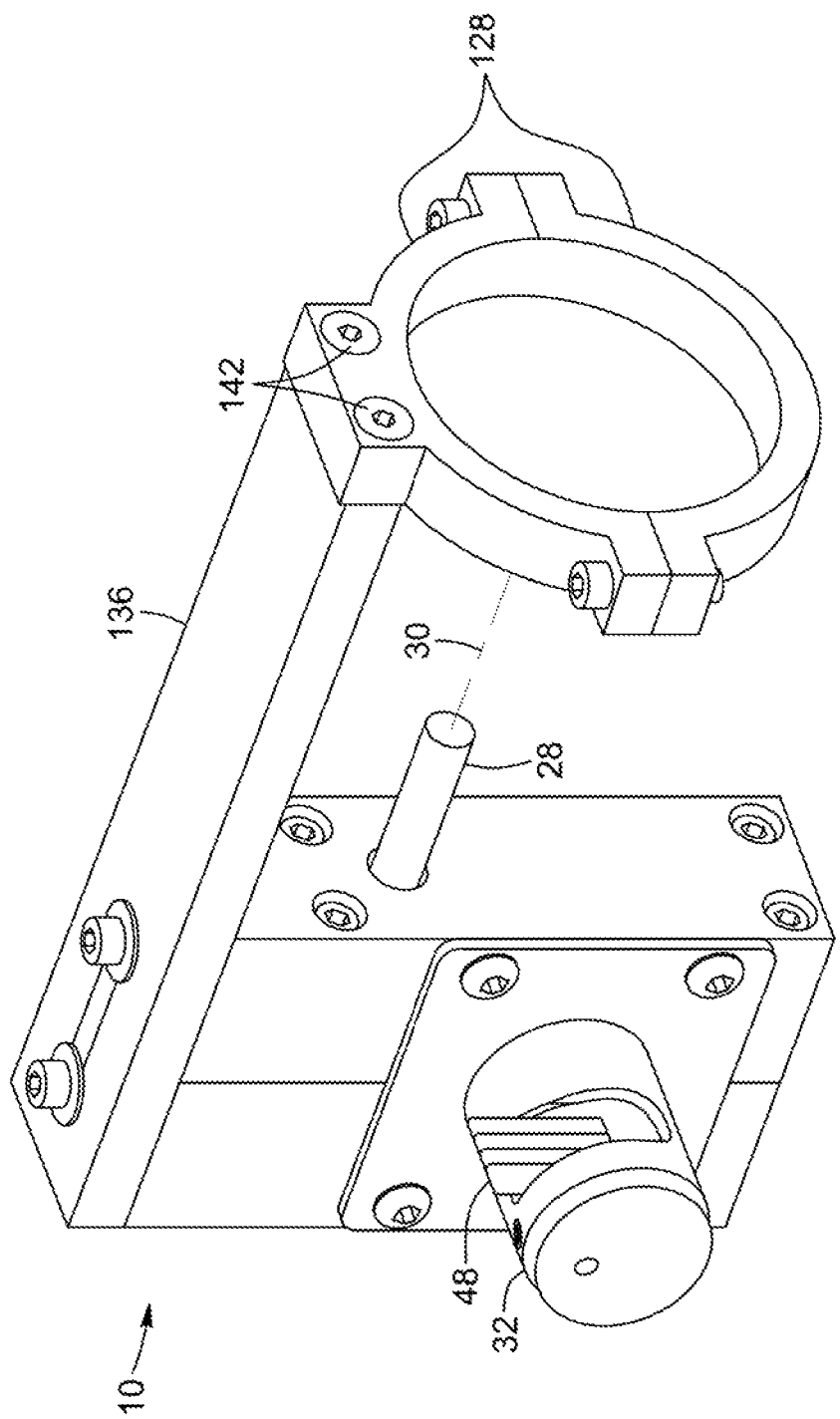
FIG. 3A is a front perspective view of a winch-winding assembly.

Referring to FIGS. 3A and 4, the winch-winding assembly 10 also includes a drive shaft 28 connected to the gear system 20 and being rotatable about a longitudinal axis 30 thereof in order to cause rotation of the gear system 20. The drive shaft 28 is configured to be engaged by the hand-held drill 36 to effect the rotation thereof. The drive shaft 28 can be any element suitable for connecting the gear system 20 to the hand-held drill 36. For example, the drive shaft 28 can refer to a generally cylindrical elongated structure. The drive shaft 28 may also be hollow.

In the illustrated embodiment shown in FIG. 4, the worm 24 is integrally connected to the drive shaft 28. In other embodiments, the drive shaft 28 can be removable from the worm 24 for selecting a corresponding drive shaft 28 according to the type of the hand-held drill 36 to be used. In some embodiments, the drive shaft 28 may be a tool such as a drive bit and/or a tool bit. The drive bit and/or tool bit may be any rotary bits suitable for use with the hand-held drill 36 and engageable with the worm 24.

In operation, the hand-held drill 36 can be activated to rotate a drill chuck 34 thereof and consequently rotate the drive shaft 28.

In some embodiments, the winch-winding assembly 10 also includes an engagement arm 32 configured to engage with and rotate the winch drum 14. The engagement arm 32 can be a cylindrical elongated structure capable of transmitting a rotational movement between two rotary parts.

With reference to FIG. 4, the engagement arm 12 includes a stem 38 rotatable about a longitudinal axis thereof. The stem 38 can be viewed as the supporting body or the elongated structure of the engagement arm 32. The stem 38 can include a tubular wall 44 defining a channel 50 and having a lateral aperture 46.

In addition, the stem 38 includes a proximal portion 40 attached to the gear system 20 to be rotated thereby, and a distal portion 42 extending away from the gear system 20. For example, the worm wheel 26 can be connected to the proximal portion 40 of the stem 38. The connection can be achieved using a fastener, press-fitting the stem 38 into an opening in the worm wheel 26 or any other suitable means.

The drive shaft 28 can be configured to be perpendicular with respect to the stem 38 of the engagement arm 32. This configuration may be more efficient when using a worm gear set 22 since the axis of rotation of the worm 24 is generally perpendicular to the axis of rotation of the worm wheel 26.

Figure 6:
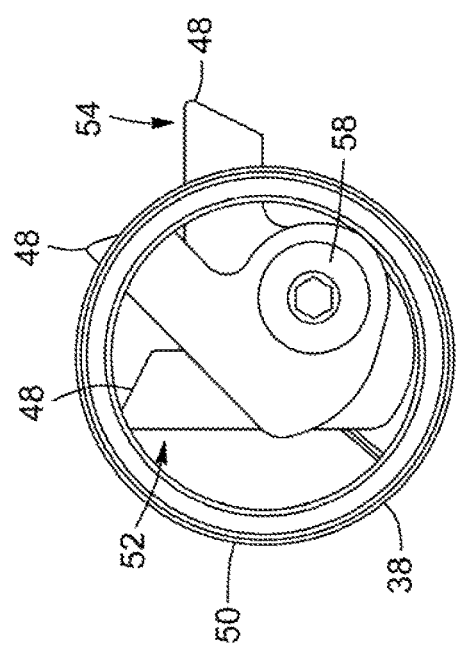
FIG. 6 is a front cross-sectional view of a finger mounted on a stem that is part of a winch-winding assembly, showing the finger extending from a retracted position to an extended position.

Referring to FIGS. 3A, 4 and 6, the engagement arm 32 also includes a finger 48 mounted to the distal portion 42 of the stem 38 and being displaceable, as shown in FIG. 6, between a retracted position 52 and an extended position 54. The finger 48 can be a connector having a shape and construction as a plate, a rod, a tube, a bar or the like. The finger 48 can include a sloped tip for allowing sufficient clearance between the sloped tip and the structure defining the lateral aperture 46 while displacing between the retracted position 52 and the extended position 54. In the illustrated embodiment, the finger 48 is mounted within the channel 50 of the stem 38.

FIG. 6 illustrates a finger 48 extending from the retracted position 52 to the extended position 54. In the retracted position 52, the finger 48 is retracted sufficiently to allow the distal portion 42 to be axially insertable into the open end 16 of the winch drum 14 (e.g., as shown in FIG. 1). In the extended position 54, the finger 48 extends through the lateral opening 18 of the winch drum 14 in order to engage and rotate the winch drum 14 in response to rotation of the stem 38.

In a preferred embodiment, the finger 48 can be mounted and configured so as to be fully housed within the channel 50 in the retracted position 52 and to partially extend through the lateral aperture 46 in the extended position 54. The partial extension of the finger 48 is preferably sufficient to securely engage the winch drum 14 through the lateral opening 18 and to prevent unintentional disengagement with the winch drum 14.

In the illustrated embodiment shown in FIG. 6, the finger 48 is pivotally mounted within the channel 50 to be pivotable between the retracted position 52 and the extended position 54.

In one embodiment, as shown in FIGS. 4 and 6, the finger 48 includes multiple coplanar finger elements. Each finger element is a plate that can independently pivot and is in contact with an adjacent finger element.

Referring back to FIG. 4, the engagement arm 32 can further include an end cap 56 fitted on an extremity of the distal portion 42, the end cap 56 comprising a hinge 58 extending within the channel 50 and to which the finger 48 is pivotally mounted. The end cap 56 can protect the finger 48, internal components of the stem, and the gear system 20 from foreign objects by sealing an end of the channel 50.

The hinge 58 can be any device connecting the finger 48 to the engagement arm 32 in order to pivot the finger 48 between the retracted position 52 and the extended position 54. In a preferred embodiment, the hinge 58 is offset with respect to the longitudinal axis of the stem 38. The offset distance can be provided depending on the length and configuration of the finger 48.

In operation, the finger 48 is mounted to the hinge 58 and configured to pivot to the extended position 54 in response to rotation of the stem 38 in a winch-tightening direction, and to pivot to the retracted position 52 in response to rotation of the stem 38 in a winch-loosening direction.

In accordance with another optional aspect, the winch-winding assembly is configured for supporting a hand-held drill.

Referring to FIGS. 2 and 4, the winch-winding assembly 10 includes a gear box 120 in which the gear system 20 is mounted. The gear box 120 can include various casing constructions adapted to contain, house or provide an outer fixed structure for the gear system 20.

Referring to FIGS. 2, 3A, 3B and 4, the winch-winding assembly 10 also includes a drill-support mechanism 124, for supporting the hand-held drill 36. The drill-support mechanism 124 comprises a support arm 126 and a collar 128.

In the illustrated embodiment, the support arm 126 has a proximal section 130 connected to the gear box 120 and a distal section 132 extending away from the gear box 120. The support arm 126 can be any rigid structure connecting the gear box 120 with the collar 128 and may be composed of one or multiple elements. The support arm 126 may also comprise a telescoping structure 160 for adjusting the distance of the collar 128 with respect to the gear box 120 and drive shaft 28. In the illustrated embodiment of FIG. 3A, the support arm 126 comprises a plate 136 fixed to and extending from an upper end of the gear box 120. In this embodiment, the plate 136 is spaced apart from and generally parallel with respect to the drive shaft 28. This configuration facilitates the use of a typical hand-held drill 36 as shown in FIG. 2.

In the illustrated embodiment, the collar 128 is connected to the distal section 132 of the support arm 126 and defines an insertion region 134 in which the hand-held drill 36 is guidable so as to engage the drive shaft 28. The collar 128 is spaced away from the drive shaft 28 and can be configured such that the collar 128 abuts on and supports a body of the hand-held drill 36 during engagement and rotation of the drive shaft 28. The term "collar" refers to a component or device comprising parts for at least partially confining, encircling or defining an opening for part of the body of the hand-held drill 36. In the illustrated embodiment of FIG. 3A, the collar 128 comprises a closed annular member defining a generally circular insertion region 134. In some embodiments, the collar is fixed in place and does not move as the drill is inserted or during winding operations. In other embodiments, the collar 128 can comprise a clamping mechanism, such as a C-clamp, for clamping and holding the body of the hand-held drill 36 after insertion and during operation. Preferably the collar 128 is made from rigid materials.

Figure 3B:
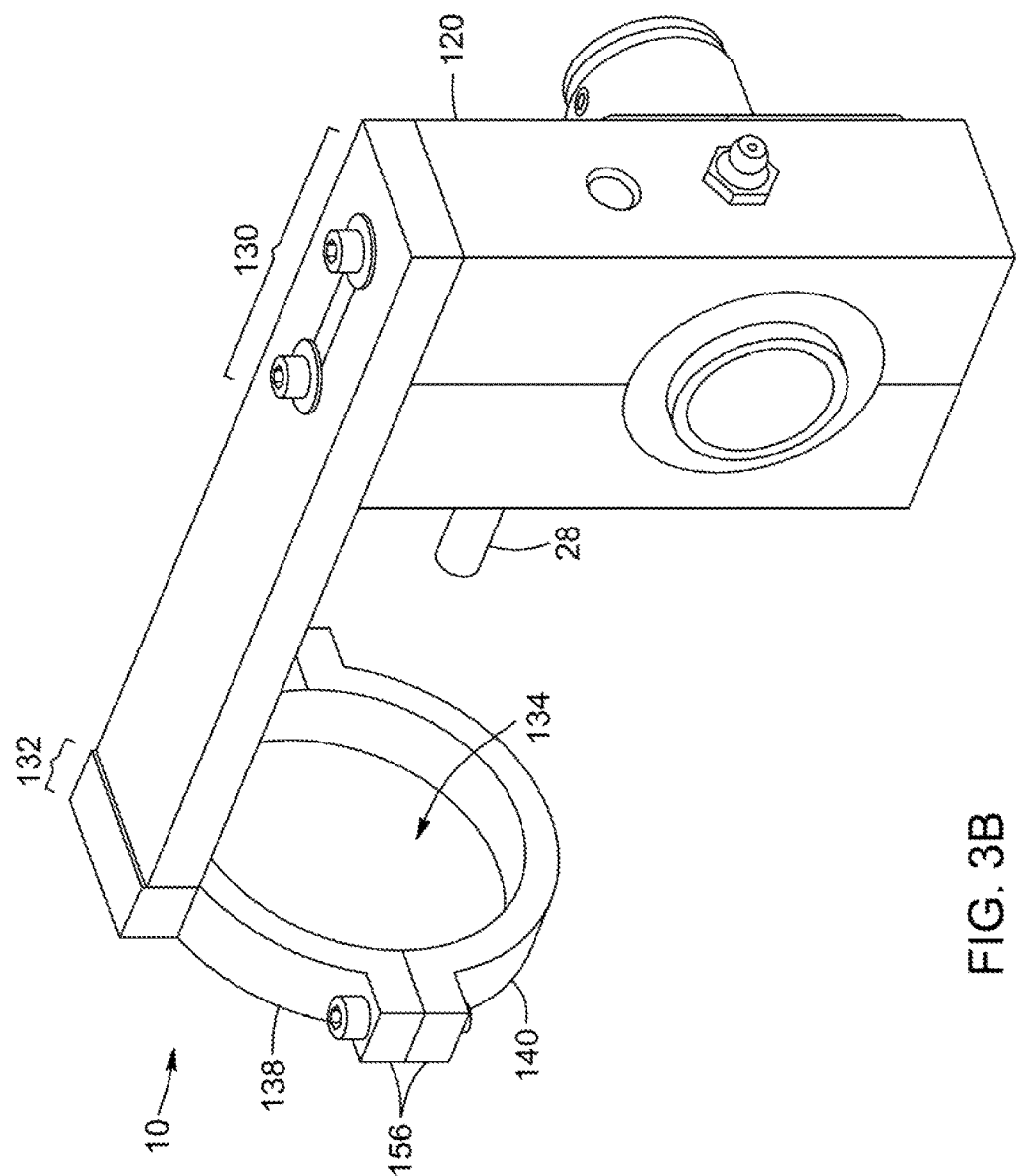
FIG. 3B is a rear perspective view of the winch-winding assembly shown in FIG. 3A.

In the illustrated embodiment of FIGS. 3A and 3B, the collar 128 comprises an upper member 138 attached to an extremity of the distal section 132 of the support arm 126 and a lower member 140 attachable to the upper member 138. The upper and lower members can have different shapes. Ideally, the shape of the insertion region 134 corresponds to the shape of the body of the hand-held drill 36. In the illustrated embodiment, the upper member 138 and the lower member 140 are generally U-shaped. This configuration can be adapted to receive a typical hand-held drill 36.

Referring to FIG. 3A, the drill-support mechanism 124 comprises at least one fastener 142 for attaching the upper member 138 to the distal section 132 of the support arm 126. Accordingly, as shown in FIG. 4, the distal section 132 of the support arm 126 includes at least one opening 144 for receiving the at least one fastener 142. In one embodiment, the upper member 138 includes a protrusion 146 extending radially from the upper member 138 and adapted to receive the at least one fastener 142.

With reference to FIG. 4, there is shown an embodiment wherein the upper member 138 includes at each end thereof a lug 148 comprising an aperture 150. The lower member 140 also includes at each end thereof a corresponding lug 152 comprising an aperture 154. Still referring to FIG. 4 and with reference to FIG. 3B, the lugs 148 of the upper member 138 can abut with respective lugs 152 of the lower member 140 to align the corresponding apertures 150, 154 and form lug pairs 156 that are connectable together to attach the lower member 140 to the upper member 138. The lugs 148, 152 generally refer to any fastening element for attaching the lower member 140 to the upper member 138.

The collar 128 can further include a plurality of lug fasteners 158, each lug fastener 158 being insertable through the apertures 150, 154 of a corresponding lug pair 156 for securing the lug pair 156 together, thereby attaching the lower member 140 to the upper member 138.

In operation, the hand-held drill 36 is inserted into the insertion region 134 of the collar 128 and guided so as to engage the drive shaft 28. The hand-held drill 36 can then be activated in order to cause rotation of the gear system 20 and consequently rotation of the engagement arm 32 for winding the flatbed winch 12. Advantageously, in some embodiment the drill-support mechanism 124 is configured to substantially reduce and/or limit transmissible torque, produced during the winding process, on a handle of the hand-held drill 36 by confining and securing the hand-held drill 36 in place.

In some implementations, the gear system is configured so that, when used with a drill and high resistance to rotation is encountered, the drill will shut down or stutter before the gears are damaged.

Figure 7:
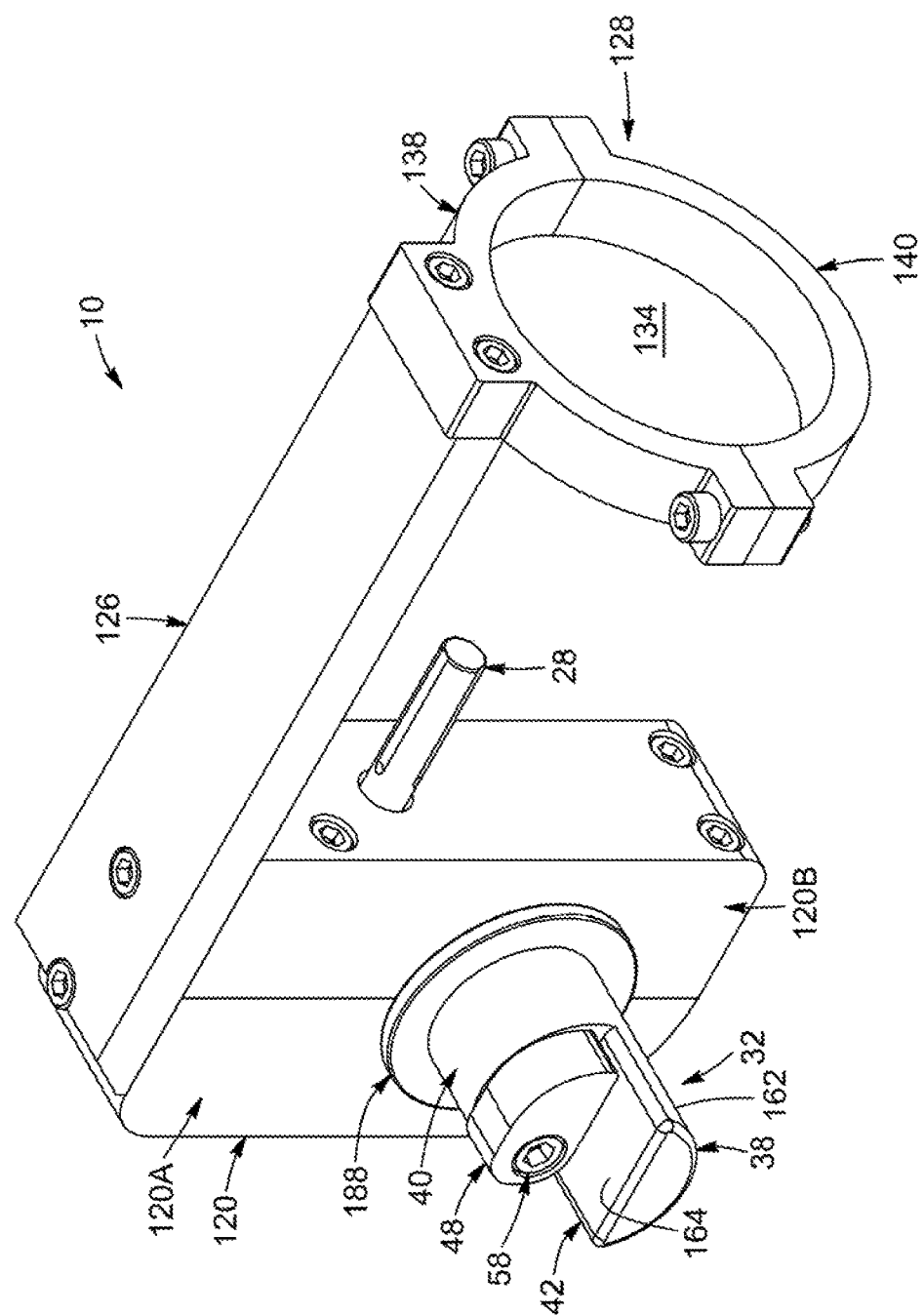
FIG. 7 is a top perspective view of another embodiment of a winch-winding assembly.

Referring now to FIGS. 7 to 27 and 29A to 29D, another embodiment of a winch-winding assembly and its components are illustrated. As shown in FIG. 7, the engagement are includes a stem 38 mounted to the worm gear to be rotated thereby, and a finger 48 mounted to the stem 38. The stem and finger construction and configuration in the embodiment of FIG. 7 are somewhat different from that of FIGS. 3A and 3B, for example.

Referring to FIG. 7, the stem 38 can include a proximal portion 40 mounted to the worm gear and a distal portion 42 for insertion into the winch drum. The stem 38 and/or either one of its proximal and distal portions 40, 42 can have a solid construction (e.g, composed of solid metal) or a hollow construction. When a hollow construction is used, the stem 38 is preferably enclosed to the outside environment to prevent particulate material or other such material from accumulating in the structure. The solid stem can be manufactured by machining a single solid metal piece to provide the desired shape and configuration. A solid construction provides advantages with respect to avoiding dirt or the like from entering in to the structure. It is also noted that the stem can be composed of a variety of materials, such as steel, aluminum or other metals or alloys; polymeric materials; composite materials; or various other materials. The material used for the stem can be designed to have certain mechanical and physical properties for the forces to be exerted on the stem.

In some implementations, the proximal portion 40 of the stem 38 can be cylindrical. The distal portion 42 can be generally half-cylindrical or partial-cylindrical, as illustrated in FIG. 7, although various other shapes and configurations may be used. The distal portion 42 may have a cross-section that is a sector of the cross-section of the proximal portion 40. The distal portion 42 may have a cross-section that is a segment of the cross-section of the proximal portion 40. Such a segmental distal portion can have a cross-section defined by a cord that is spaced away from the center of the circular cross-section of the proximal portion 40, e.g., by about 10%-15% of the diameter of the circular cross-section of the proximal portion 40. The distal and proximal portions are preferably configured to be generally parallel and have a single longitudinal axis. The proximal and distal portions of the stem preferably have a one-piece integral structure.

Figure 12:
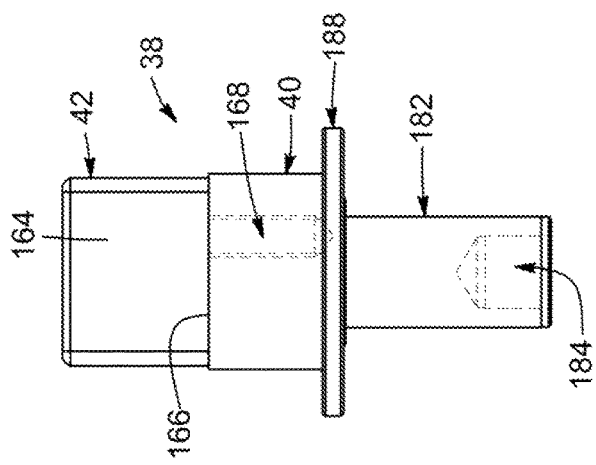
FIG. 12 is a side plan partial transparent view of part of an engagement arm that can be part of a winch-winding assembly.
Figure 13:
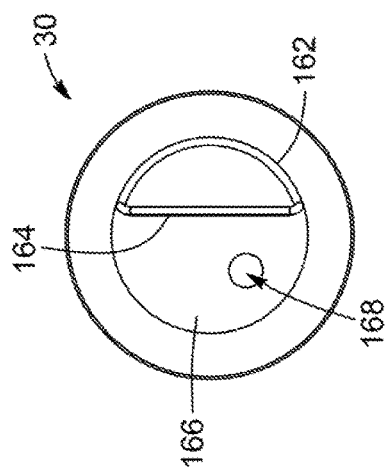
FIG. 13 is a front plan view of FIG. 12.

Referring to FIGS. 12 and 13, in some implementations, the distal portion 42 may have an outer surface 162 that is co-planar and continuous with the adjacent outer surface of the proximal portion 40. The distal portion 42 can also have an inner surface 164 that can be generally flat and extends to meet the proximal portion at a generally normal angle. The distal and proximal portions can be configured and connected such that there is a connection surface 166 (which can be defined by the part of the end of the proximal portion to which the distal portion does not attach) for mounting the finger. The connection surface 166 can be substantially normal to the longitudinal axis of the stem and/or to the inner surface 162. The finger can be mounted using a bolt or other fastener that is secured within a fastening hole 168 that extends into the proximal portion 40 from the connection surface 166. The fastener preferably extends axially into the proximal portion.

Referring still to FIGS. 12 and 13, the fastening hole 168 can positioned depending on the size and shape of the finger and can be offset from the cross-sectional center of the stem (e.g., of the proximal portion). FIGS. 29A to 29D illustrate the finger pivotally mounted with a fastener having an offset position.

It is noted that certain components can be sized to provide an amount of play therebetween. For example, the fastener that pivotally retains the finger can be slightly smaller than the hole in the finger through which is passes, providing an amount of play. In addition, the finger can be sized and configured so that there is an amount of play in between its rear end and the inner surface of the distal portion to facilitate pivoting from closed to open positions, as illustrated in FIGS. 29A to 29D.

Figure 14:
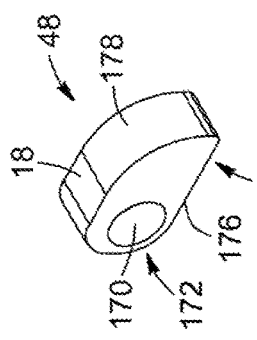
FIG. 14 is a perspective view of a finger that can be part of a winch-winding assembly.

Turning now to FIG. 14, in some implementations the finger 48 can have an opening 170 through which a fastener can pass to pivotally secure the finger 48 to the stem. The finger 48 can also have a rear end 172 and a forward end 174, the rear end having the opening 170 and the forward end being the distal part that engages the winch drum. In some implementations, the finger 48 can have a size, shape and configuration to be located within the nook of the distal and proximal portions of the stem, as illustrated in FIG. 7, and to not extend beyond the cylindrical boundary that would be defined by the proximal portion of the stem. The finger 48 can have a rounded polygon cross-sectional shape. The rear end can have a generally rectangular cross-sectional shape (e.g., with rounded corners) and the forward end can have a generally triangular or quarter-circle cross-sectional shape. In some scenarios, the finger can have a quarter-stadium cross-sectional shape. The finger 49 can have a bottom surface 176 that is generally flat and straight, and a tom surface that has a contoured portion 178 and a flat part 180. The top surface of the finger 48 can be provided to generally follow the contour or curvature of the outer surface of the proximal portion, as illustrated in FIG. 7. The thickness of the FIG. 48 can be constant along its length. The part of the finger 48 that passes through an opening in the winch drum is sized to be smaller than the opening. The finger 48 is preferable a one-piece integral structure.

Figure 11:
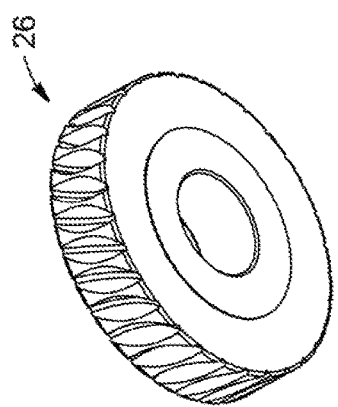
FIG. 11 is a perspective view of a worm wheel that can be part of a winch-winding assembly.
Figure 16:
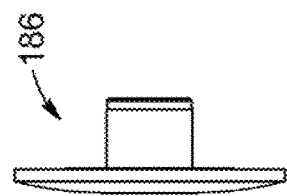
FIG. 16 is a side plan view of a cap element that can be part of a winch-winding assembly.
Figure 17:
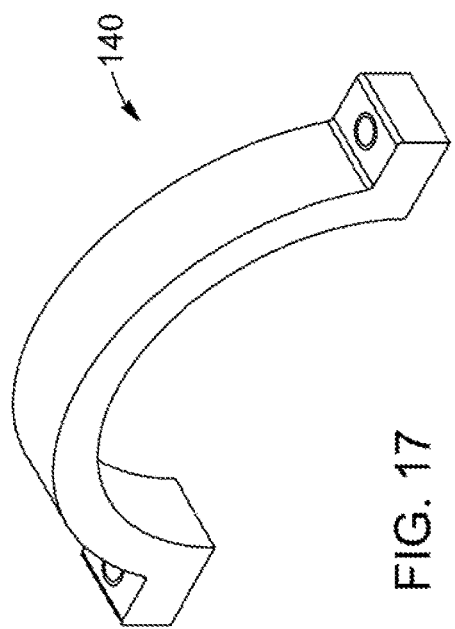
FIG. 17 is a perspective view of bottom part of a collar that can be part of a winch-winding assembly.
Figure 15:
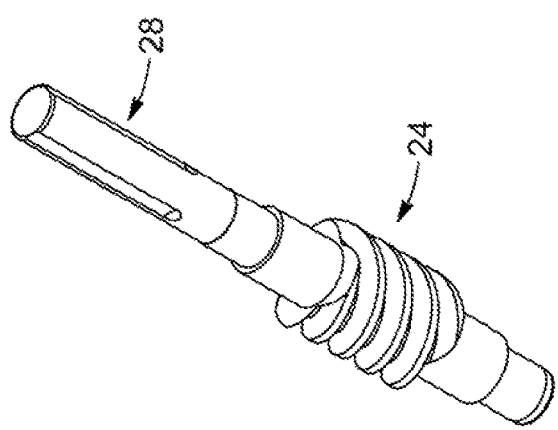
FIG. 15 is a worm that can be part of a winch-winding assembly.
Figure 19:
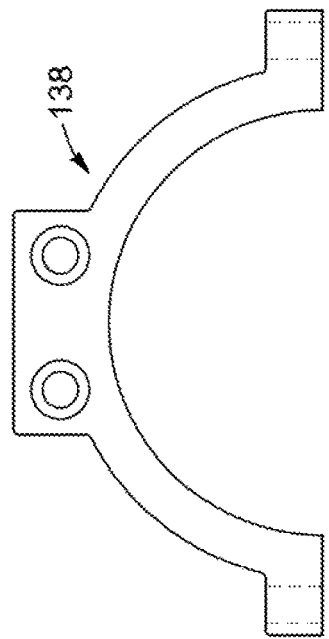
FIG. 19 is a perspective view of a bottom part of a collar that can be part of a winch-winding assembly.
Figure 20:
FIG. 20 is a side plan partial transparent view of a top part of a collar that can be part of a winch-winding assembly.
Figure 18:
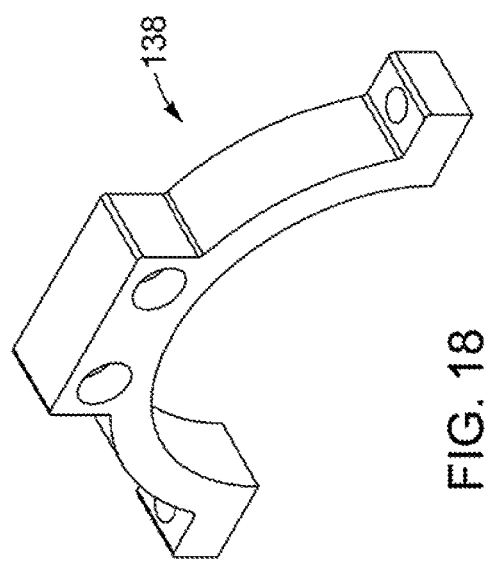
FIG. 18 is a perspective view of a top part of a collar that can be part of a winch-winding assembly.
Figure 24:
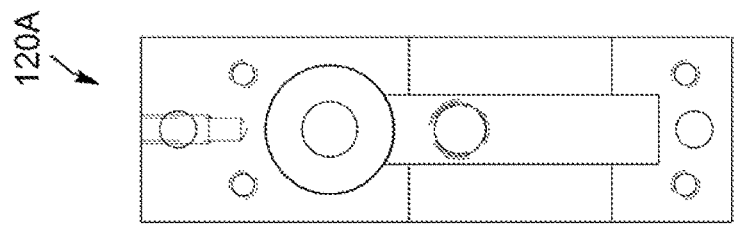
FIG. 24 is a side front partial transparent view of part of a gear box that can be part of a winch-winding assembly.
Figure 23:
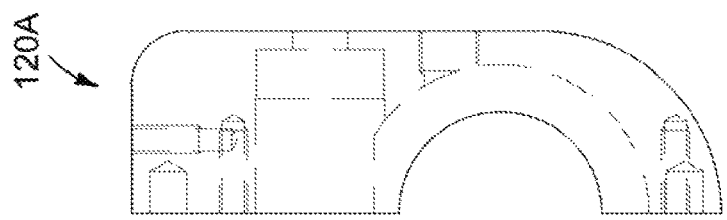
FIG. 23 is a side plan partial transparent view of part of a gear box that can be part of a winch-winding assembly.
Figure 22:
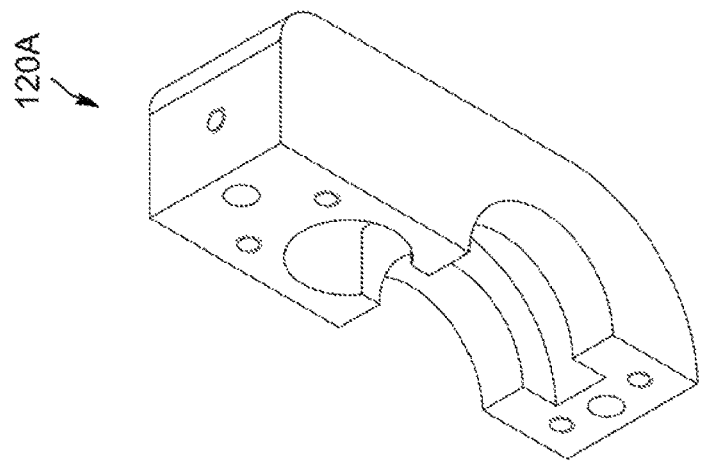
FIG. 22 is a perspective view of part of a gear box that can be part of a winch-winding assembly.
Figure 21:
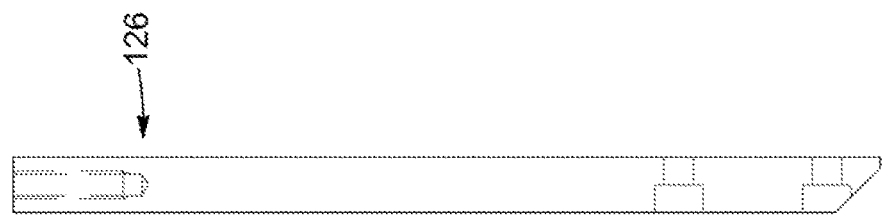
FIG. 21 is a top plan partial transparent view of part of a support arm that can be part of a winch-winding assembly.
Figure 27:
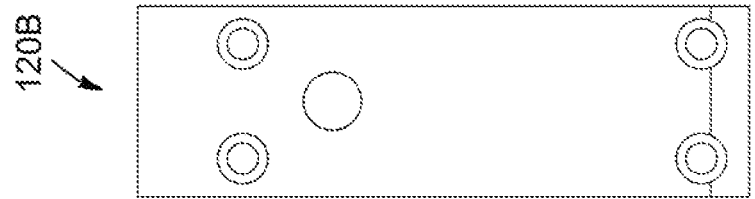
FIG. 27 is a side front partial transparent view of another part of a gear box that can be part of a winch-winding assembly.
Figure 26:
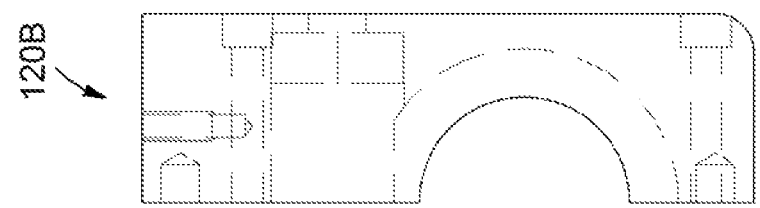
FIG. 26 is a side plan partial transparent view of another part of a gear box that can be part of a winch-winding assembly.
Figure 25:
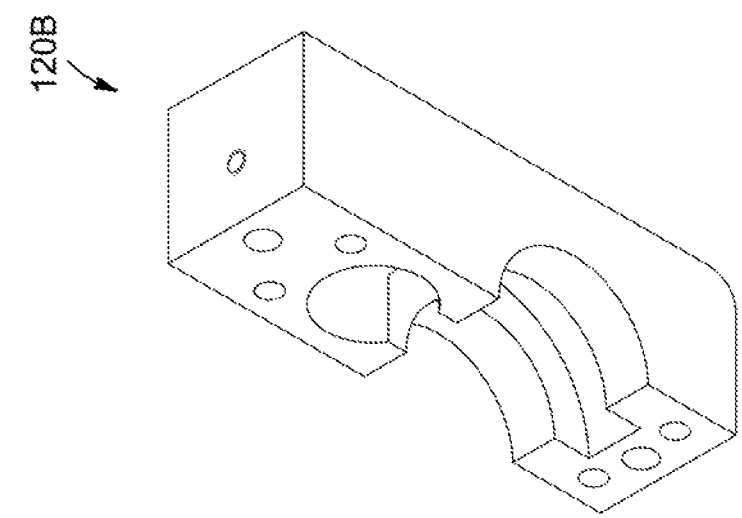
FIG. 25 is a perspective view of another part of a gear box that can be part of a winch-winding assembly.

Referring to FIG. 13, the stem 38 can also include a rear portion 182 that can be inserted within the gear 26 (as shown in FIG. 11). The rear portion 182 can include a back hole 182 into which a cap 186 (as shown in FIG. 16) can be fit. FIG. 13 also illustrates a stem flange 188 that is connected to the proximal portion 40 and abuts on the gear box (as shown in FIG. 7). FIG. 9 also shows an annular insert 190 can be provided in between the rear portion 182 of the stem 38 and the gear 26.

Referring to FIGS. 7 and 22 to 27, the gear box can include two compartments 120A and 120B, which can be coupled using various mechanisms, such as screws or bolts or other types of fasteners.

Referring now to FIGS. 29A to 29D, the stem 38 and finger 48 are schematically illustrated during rotation of the stem 38 in direction R. When the finger is pivotally mounted to the stem it is able to move from a retracted position (as in FIGS. 29A and 29B) to an extended position (as in FIGS. 29C and 29D). The finger 48 can pivot to the extended position by gravity once rotation is sufficient. Once in the extended position, the finger can engage the winch drum via one of the lateral openings. Referring to FIG. 29D, the finger 48 can engage the winch drum at an engagement region 192 while the opposing side of the finger abuts on the stem (e.g., on part of the distal portion which may be the inner surface or an edge between the inner and outer surfaces) at an abutment region 194. The engagement region 192 and/or the abutment region 194 can be provided with various features, such as reinforcements, surface treatments, structural features such as grooves or cooperating shapes with respect to the elements that they contact, and so on.

Figure 34:
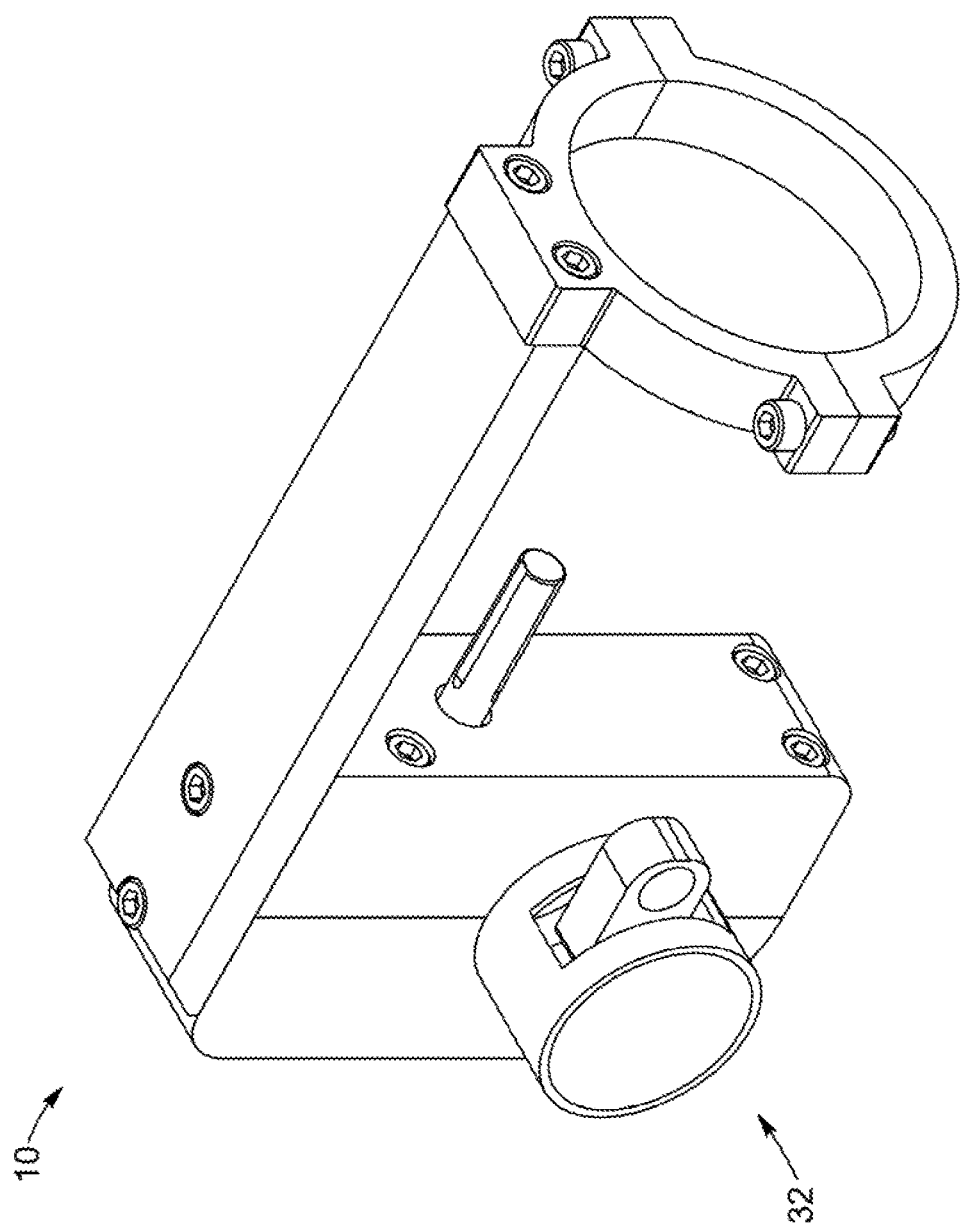
FIGS. 34 and 35 are perspective views of a winding assembly.
Figure 35:
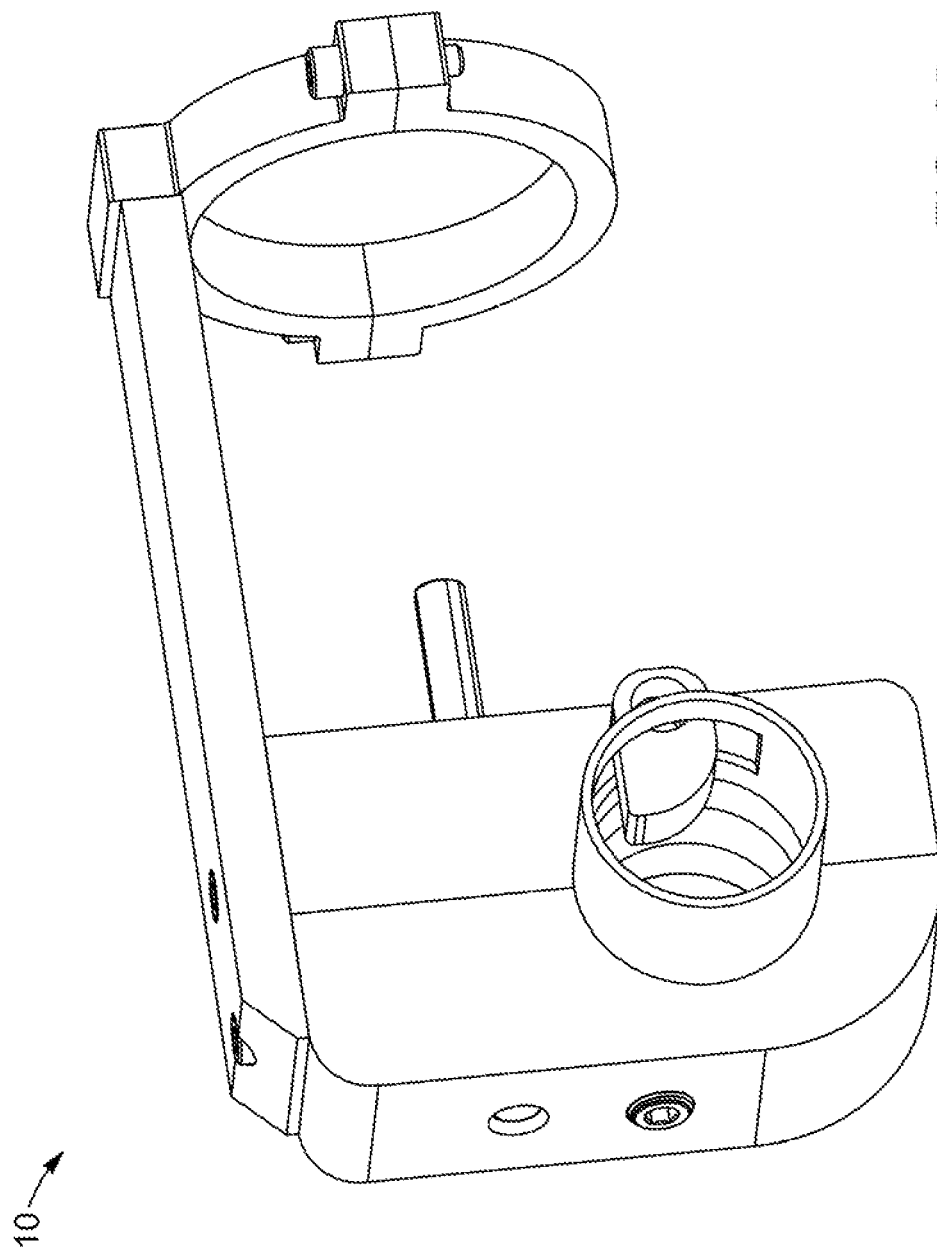

Referring now to FIG. 28, another embodiment of a winch-winding assembly and some of its components are illustrated. In this embodiment, the engagement arm 32 has an alternative construction where the stem 38 has a tubular structure and the finger 48 is mounted such that it extends inwardly to engage the opening in the winch drum from the outside, rather than from the inside as with the other embodiments described herein. In this embodiment, the finger 48 can be mounted to pivot or pass within a slot provided in the stem. The finger 48 can be mounted within the tubular wall or outside the tubular wall using various mechanisms and arrangements. For example, the tubular wall may be thick enough to provide a bolt that passes through a hole in the finger 48, similar to what is described and illustrated for the embodiment of FIG. 7 but with the bolt passing into the tubular wall of the stem. The stem may be provided with an external mounting structure on the outside of the tubular member and to which the finger 48 is pivotally mounted. Thus, for this embodiment, the tubular stem is provided over the which drum, i.e., the end of the winch drum is inserted into the tubular stem, and the stem is rotated to a position at which the finger falls into the opening of the winch drum and engages it to enable rotation of the winch drum and rolling of the strap. In the embodiment of FIG. 28, the other components (e.g., gears, drill support mechanisms, etc.) of the assembly 10 can be substantially similar to those of the other embodiments described in detail herein. FIGS. 34 and 35 also illustrate an embodiment of a winding assembly 10 where the engagement arm includes a finger extends from the outside of a hollow stem into the cavity in order to engage a drum for rotation.

It is also noted that embodiments of the winch-winding assembly described and illustrated herein can also be used with or adapted for winding applications other than winding tie-down straps using a flatbed winch. In some scenarios, the winch-winding assembly can be used for winding a winch or other type of rolling device for winding an elongated flexible structure, such as a tube, a hose, a cord, an electrical wire or line, an extension cord, a strap or other type of flat flexible elongated element, and the like. In some scenarios, the winding assembly 10 is used for elongate flexible elements that still have some rigidity, such as cold or ice-coated straps, in order to reform the elongate elements around the winding drum. In other implementations, the assembly 10 can be used with a drill or another type of drive device for engaging with and rotating various different rotatable shafts in different applications. In some scenarios, embodiments of the winding assembly can be used in conjunction with a manual crank or another manual drive device rather than a drill or motorized drive device. The drill-support mechanism could be adapted to support and/or guide other types of motorized or manual drive devices.

Figure 30:
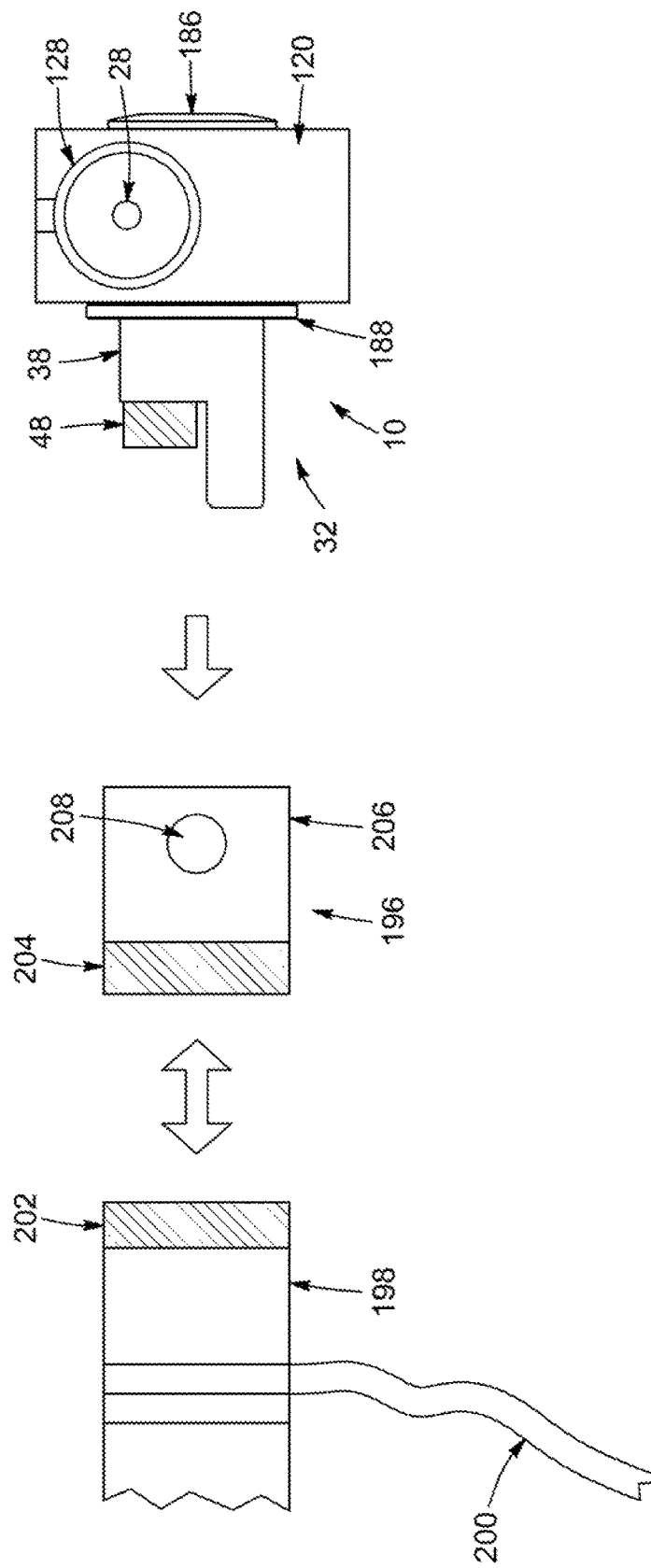
FIG. 30 is a plan view schematic of a winding assembly, an adaptor and a windable device.

Referring to FIG. 30, in some scenarios an adaptor 196 can be provided for facilitating coupling of the winch-winding assembly 10 with a rotatable winding device 198 for winding an elongate flexible element 200. The rotatable winding device 198 can include a connection element 202 which may be at an end of the rotatable drum around with the elongate flexible element 200 can be wound. The adaptor 196 includes an adaption portion 204 and an engagement portion 206, the former being configured for coupling to the connection element 202 to secure together, and the latter being configured for engagement by the engagement arm 32 of the winding assembly 10. The adaption portion 204 can include various constructions, e.g., a universal adaptor that can be secured to various cylindrical drums or structures, or by various mechanisms such as pins, clamps, chemical bonding, fasteners, and so on. The engagement portion 206 can include an opening 208 and can have a similar shape and construction as the end of a winch drum used in flatbed tie-down strap applications. The engagement portion 206 is configured to allow insertion of the engagement arm 32 of the winding assembly 10 so that the finger 48 can engage the adapter and enable rotation thereof, thus allowing the elongate flexible element 200 to be rolled or wound around the rotatable winding device 198.

The winding assembly 10 can be manufactured and sold alone for a pre-determined purpose, such as flatbed tie-down straps, or a variety of end uses. In some scenarios, the winding assembly 10 can be provided as part of a pre-assembled drill-and-assembly unit (as illustrated in FIG. 2, for example) where the collar has been securely fastened to the neck of the drill or another appropriate part of the drill. Various kinds of drills can be used, preferably those having a portion on the neck to which the collar can be securely fastened. In the pre-assembled drill-and-assembly unit, the drill can also be pre-coupled to the drive shaft 28, making the unit ready for use. In some scenarios, the winding assembly 10 can be provided as part of a kit, which may include a drill, an adaptor (e.g., 196 in FIG. 30), and other components, such as a tool for securing the components together (e.g., tool for securing collar to the drill), drill batteries, lighting attachments, and so on. In some scenarios, a set of different fingers having different shapes and/or sizes can be provided as part of the kit for different applications (e.g., depending on the size and configuration of the winch drum to be engaged and rotated). The kit may include instructions regarding assembly and use of the assembly. For example, the instructions may indicate a certain drill setting that may be preferred for operation of the winding assembly (e.g., screw setting preferred; torque level; speed of rotation; direction of rotation for engagement and winding versus disengagement and removal of the assembly; setting for automatic shutoff or break of the drill; etc.).

In some implementations, the winding assembly 10 can include two engagement arms 32 extending from opposed sides (e.g., of the gear box) to enable cooperation with a winch device or the like from either direction. This can be useful particularly for scenarios where drums of different types, constructions or accessibilities are to be rotated. In addition, the engagement arm can be configured to be removably connectable to the gear box such that a single arm component can be used on either side of the gear box.

Figure 31:
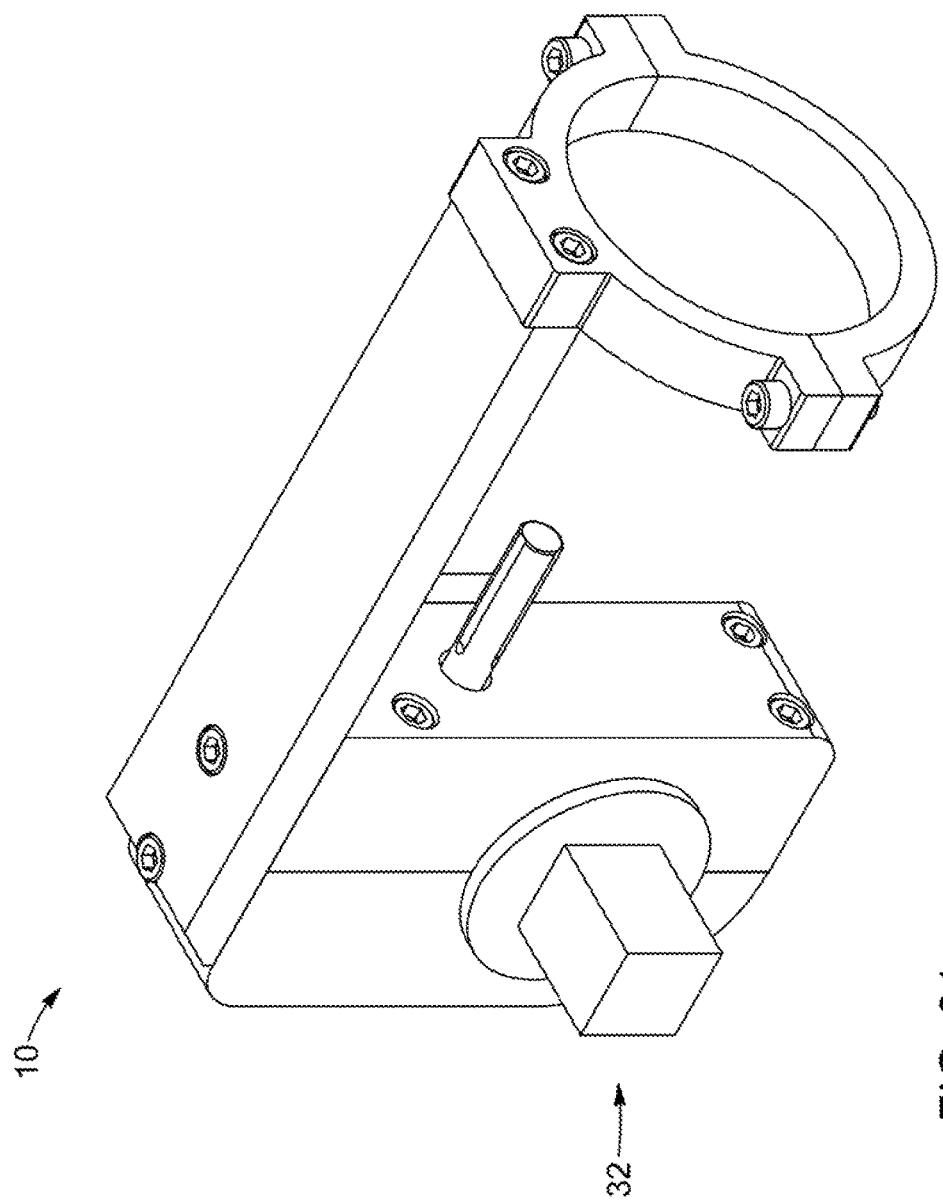
FIG. 31 is a perspective view of a winding assembly.
Figure 32:
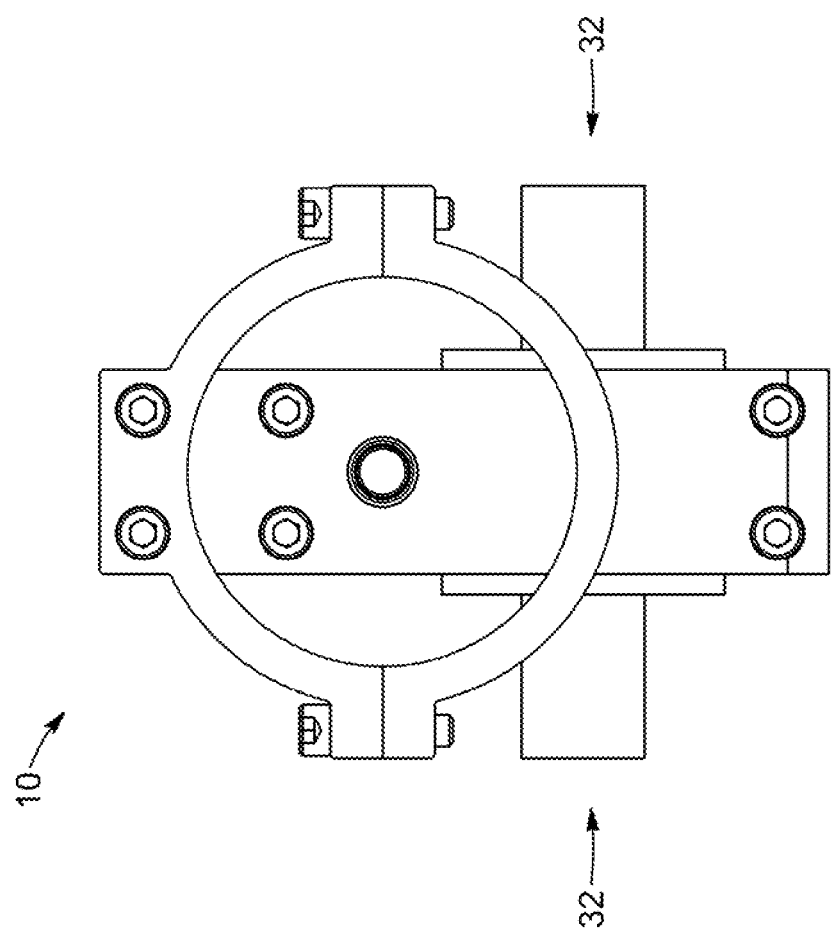
FIG. 32 is a side plan view of a winding assembly.
Figure 33:
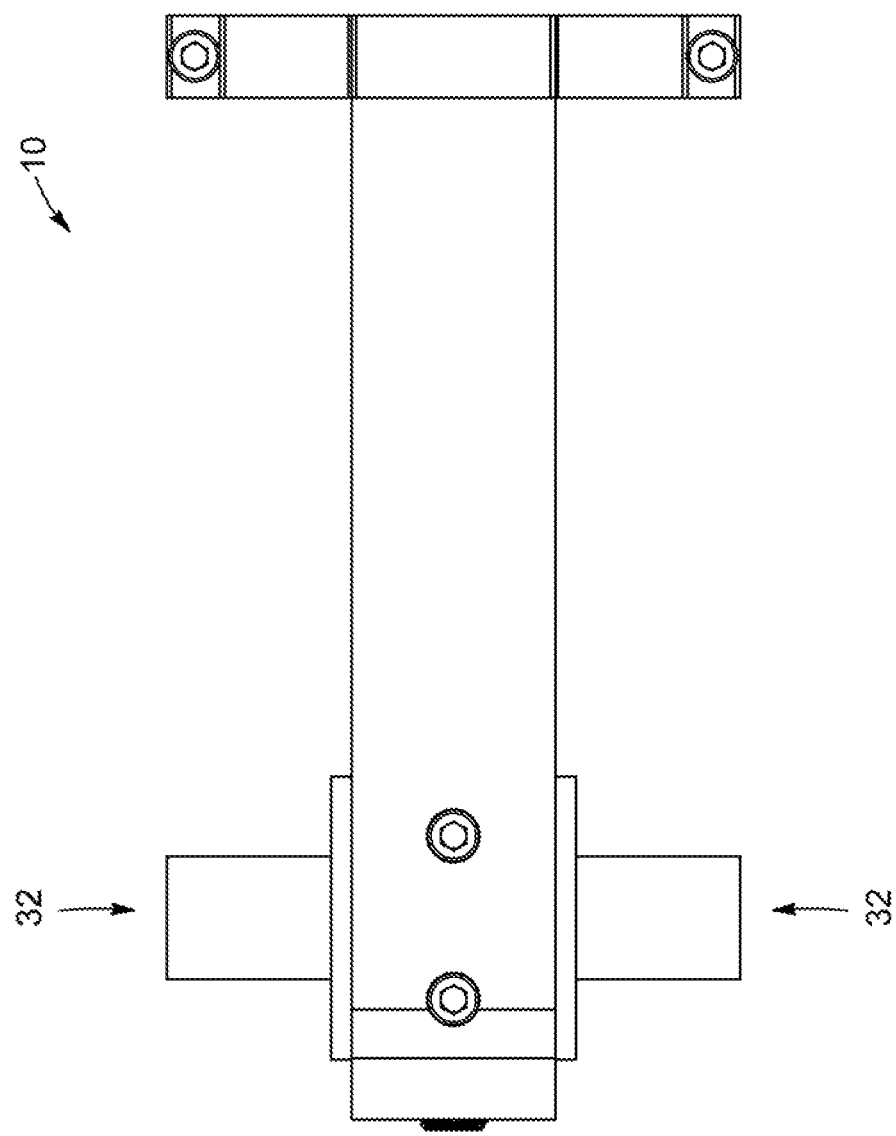
FIG. 33 is a top plan view of a winding assembly.

In some implementations, referring to FIGS. 31 to 33, the winding assembly 10 can be configured such that the engagement arm includes a block for insertion into a corresponding windable drum. The block can be configured and shaped to have at least one side engagement surface that abuts against an internal surface of the windable drum to rotate the drum. The block may be configured to have a corresponding shape to the drum. The block may be composed of solid metallic material, and may have a cross-section that is constant along its length and that is substantially square or rectangular. As illustrated in FIGS. 32 and 33, there may be two opposed blocks extending from either side of the gear box of the winding assembly. In some scenarios, all of the other features of the assembly, such as the gear box, the support arm and collar can be the same as described above for other embodiments.

In some implementations, the winding assembly 10 having a block engagement arm can be used for train or railway applications where rotatable drums/shafts having square-shaped cavities are used. The block can be inserted within the square cavity of the shaft, and then rotated in order to exert rotational force on the shaft to enable rotation. Square cavity shafts used in the railway industry can be accessible from only one direction, and thus the winding assembly 10 can have two blocks extending from either side of the gear box in order to facilitate insertion and rotation from either side. FIGS. 31 to 33 provide example illustrations of the assembly 10 and blocks that can be used for railway applications. In some scenarios, the engagement arm can have a configuration to engage other types of rotatable elements, and may for example include an end cavity defined by side walls that receives the end of a rotatable element and the side walls have internal surfaces that abut against the end of the rotatable element to facilitate rotation.

In some implementations, the engagement arm can be removably connectable to the gear system via a connection mechanism, which may include a quick-clip mechanism, lip-and-groove, nodule-and-groove, magnetic, and/or other types of connections. It should be noted that engagement arms of different types, sizes and/or configurations can be provided for different applications. For example, a set of engagement arms can be provided and can be removably connectable to the gear system. At least one of the engagement arms can be a stem-and-finger type as described as illustrated herein. In some scenarios, engagement arms can be provided to be removably connectable to both sides of the gear system; for instance, one engagement arm can be configured to be connectable to a first side of the gear system and another engagement arm can be configured to be connectable to a second side of the gear system, with the two engagement arms being configured to have the appropriate orientation for engaging and rotating a winch drum or other type of rotatable element from the respective sides. The set of engagement arms can includes arm adapters designed for specific applications, such flatbed winch drum winding, rotation of drum or other rotatable elements used in railway applications, and other rotation applications, particularly applications that require a 90 degree angle between the drill drive direction and the rotation axis. The connection mechanism for mounting the arms to the gear system can include a connector portion protruding out from the gear system and having a structure enabling the arms to fit over or within the connector portion to become rotationally fixed relative to the connector portion. Thus, when the connector portion is rotated by the gear system, the arm can be rotated accordingly. In some scenarios, the connector portion can be similar or identical to the block as illustrated herein, and the arms can include a proximal portion that connects relative to the block.

In some scenarios, the winding assembly 10 may be used with a Makita™ drill, preferably used in screw-mode at a level of 7 or 8. The collar can be configured to attach to the neck of the drill where a drill-grip could be connected.

In the above description, the same numerical references refer to similar elements. Furthermore, for the sake of simplicity and clarity, namely so as to not unduly burden the figures with several reference numbers, not all figures contain references to all the components and features, and references to some components and features may be found in only one figure, and components and features of the present invention illustrated in other figures can be easily inferred therefrom. The embodiments, geometrical configurations, materials mentioned and/or dimensions shown in the figures are optional, and are given for exemplification purposes only.

Furthermore, although the present invention may be used with various objects, such as flatbed winches, for example, it is understood that it may be used with other winding objects. For this reason, expressions such as "flatbed winch", "winch", etc. as used herein should not be taken as to limit the scope of the present invention to these devices, on which a rope or strap is to be wound, in particular. These expressions encompass all other kinds of materials, objects and/or purposes with which the present invention could be used and may be useful, as can be easily understood.

The invention claimed is:

1. A winch-winding assembly connectable to a flatbed winch for winding tie-down straps, the flatbed winch comprising a winch drum having an open end and a lateral opening, the winch-winding assembly comprising:
   a gear system;
   a drive shaft connected to the gear system and being rotatable about a longitudinal axis thereof in order to cause rotation of the gear system;
   an engagement arm configured to engage with and rotate the winch drum, the engagement arm comprising:
     a stem rotatable about a longitudinal axis thereof and comprising:
       a proximal portion attached to the gear system to be rotated thereby; and
       a distal portion extending away from the gear system; and
     a finger mounted to the stem and being pivotable between:
       a retracted position where the finger is retracted sufficiently to allow the distal portion to be axially insertable with respect to the open end of the winch drum; and
       an extended position where the finger extends through the lateral opening of the winch drum in order to engage and rotate the winch drum in response to rotation of the stem.

2. The winch-winding assembly of claim 1, wherein the gear system comprises a worm gear set.

3. The winch-winding assembly of claim 2, wherein the worm gear set comprises:
   a worm integrally connected to the drive shaft; and
   a worm wheel connected to the proximal portion of the stem.

4. The winch-winding assembly of claim 3, wherein the drive shaft is configured to be perpendicular with respect to the stem of the engagement arm.

5. The winch-winding assembly of claim 1, wherein the stem is a solid structure.

6. The winch-winding assembly of claim 1, wherein the proximal portion of the stem is cylindrical and the distal portion of the stem is partial-cylindrical.

7. The winch-winding assembly of claim 6, wherein the distal portion has a cross-section that is a segment of a circular cross-sectional of the proximal portion.

8. The winch-winding assembly of claim 7, wherein segment is spaced away from a cross-sectional center of the proximal portion.

9. The winch-winding assembly of claim 1, wherein the finger comprises a finger opening that is mounted about a fastener that is fixed within the stem.

10. The winch-winding assembly of claim 9, wherein the fastener extends axially into the stem, and the finger is radially pivotable about the fastener.

11. The winch-winding assembly of claim 9, wherein the fastener is offset with respect to a cross-sectional center of the proximal portion.

12. The winch-winding assembly of claim 1, wherein the finger is a single one-piece structure.

13. The winch-winding assembly of claim 1, wherein the finger has a shape such that an outer edge of the finger follows contours of the proximal portion of the stem.

14. The winch-winding assembly of claim 1, wherein the finger has a quarter-stadium cross-sectional shape.

15. A winch-winding assembly connectable to a flatbed winch for winding tie-down straps, the flatbed winch comprising a winch drum having an open end and a lateral opening, the winch-winding assembly comprising:
   a gear system;
   a drive shaft connected to the gear system and being rotatable about a longitudinal axis thereof in order to cause rotation of the gear system;
   the gear system comprising a worm gear set comprising:
     a worm integrally connected to the drive shaft; and
     a worm wheel;
   an engagement arm configured to engage with and rotate the winch drum, the engagement arm comprising:
     a stem rotatable about a longitudinal axis thereof and comprising:
       a proximal portion attached to the worm wheel to be rotated thereby; and
       a distal portion extending away from the gear system; and
     the stem of the engagement arm being configured to be perpendicular with respect to the drive shaft;
     a finger mounted to the stem and being displaceable between:
       a retracted position where the finger is retracted sufficiently to allow the distal portion to be axially insertable into or over the winch drum to align with the lateral opening; and an extended position where the finger extends through the lateral opening of the winch drum in order to engage and rotate the winch drum in response to rotation of the stem;

wherein the finger is configured to pivot from the retracted position to the extended position in response to rotation of the stem.

16. The winch-winding assembly of claim 15, wherein the stem comprises a tubular wall defining a channel and having a lateral aperture, and wherein the finger is mounted within the channel; the finger is mounted and configured so as to be fully housed within the channel in the retracted position and to partially extend through the lateral aperture in the extended position; the finger is pivotally mounted within the channel to be pivotable between the retracted position and the extended position; the engagement arm further comprises an end cap fitted on an extremity of the distal portion, the end cap comprising a hinge extending within the channel and to which the finger is pivotally mounted; and the finger is mounted to the hinge and configured to pivot to the extended position in response to rotation of the stem in a winch-tightening direction, and to pivot to the retracted position in response to rotation of the stem in a winch-loosening direction.

17. The winch-winding assembly of claim 15, wherein the drive shaft is configured to be engaged by a hand-held drill to effect the rotation thereof.

18. The winch-winding assembly of claim 15, wherein the stem is a solid structure; the proximal portion of the stem is cylindrical and the distal portion of the stem is partial-cylindrical; the proximal portion of the stem is cylindrical and the distal portion of the stem is partial-cylindrical; the distal portion has a cross-section that is a segment of a circular cross-sectional of the proximal portion; the finger comprises a finger opening that is mounted about a fastener that is fixed within the stem; the fastener extends axially into the stem, and the finger is radially pivotable about the fastener; and the fastener is offset with respect to a cross-sectional center of the proximal portion.

19. The winch-winding assembly of claim 15, wherein the finger has a shape such that an outer edge of the finger follows contours of the proximal portion of the stem; the finger is mounted to the stem so as to be radially pivotable between the retracted position and the extended; and the engagement arm is configured so that when the finger is in the retracted position the distal portion is axially insertable into the winch drum to align with the lateral opening.

20. A winding assembly connectable to a winding device for winding an elongated flexible structure, the winding device comprising a drum having an open end and a lateral opening, the winding assembly comprising:

a gear system;
a drive shaft connected to the gear system and being rotatable about a longitudinal axis thereof in order to cause rotation of the gear system;
the gear system comprising a worm gear set comprising:
 a worm integrally connected to the drive shaft; and
 a worm wheel;
an engagement arm configured to engage with and rotate the drum, the engagement arm comprising:
 a stem rotatable about a longitudinal axis thereof and comprising:
  a proximal portion attached to the worm wheel to be rotated thereby; and
  a distal portion extending away from the gear system; and
  the stem of the engagement arm being configured to be perpendicular with respect to the drive shaft;
 a finger mounted to the stem and being displaceable between:
  a retracted position where the finger is retracted sufficiently to allow the distal portion to be axially insertable into or over the drum to align with the lateral opening; and
  an extended position where the finger extends through the lateral opening of the winch drum in order to engage and rotate the drum in response to rotation of the stem;
 wherein the finger is configured to pivot from the retracted position to the extended position in response to rotation of the stem.

21. The winding assembly of claim 20, wherein the stem is a solid structure; the proximal portion of the stem is cylindrical and the distal portion of the stem is partial-cylindrical; the distal portion has a cross-section that is a segment of a circular cross-sectional of the proximal portion; the finger comprises a finger opening that is mounted about a fastener that is fixed within the stem; the finger opening and the fastener define an amount of play therebetween; the fastener extends axially into the stem; and the finger is radially pivotable about the fastener.

22. The winding assembly of claim 20, wherein the winding assembly is configured for winding of a flatbed winch as the winding device and the elongated flexible structure is a tie-down strap.

23. The winding assembly of claim 20, wherein the finger has a shape such that an outer edge of the finger follows contours of the proximal portion of the stem, and has a quarter-stadium cross-sectional shape.

* * * * *